US010057629B2

(12) United States Patent
Kawakami et al.

(10) Patent No.: US 10,057,629 B2
(45) Date of Patent: Aug. 21, 2018

(54) TERMINAL DEVICE, VIDEO DISTRIBUTION DEVICE, AND PROGRAM

(71) Applicant: DWANGO Co., Ltd., Chuo-ku, Tokyo (JP)

(72) Inventors: Nobuo Kawakami, Tokyo (JP); Taihei Hosokawa, Tokyo (JP); Kenichi Miyazaki, Tokyo (JP); Shinya Kuroda, Tokyo (JP); Takashi Kojima, Tokyo (JP)

(73) Assignee: DWANGO CO., LTD., Tokyo (JP)

( * ) Notice: Subject to any disclaimer, the term of this patent is extended or adjusted under 35 U.S.C. 154(b) by 5 days.

(21) Appl. No.: 15/123,343

(22) PCT Filed: Mar. 13, 2015

(86) PCT No.: PCT/JP2015/057466
§ 371 (c)(1),
(2) Date: Sep. 2, 2016

(87) PCT Pub. No.: WO2015/146630
PCT Pub. Date: Oct. 1, 2015

(65) Prior Publication Data
US 2017/0070770 A1 Mar. 9, 2017

(30) Foreign Application Priority Data
Mar. 24, 2014 (JP) .................. 2014-060803

(51) Int. Cl.
*H04N 5/445* (2011.01)
*H04N 21/431* (2011.01)
*H04N 21/482* (2011.01)

(52) U.S. Cl.
CPC ..... *H04N 21/4314* (2013.01); *H04N 21/4821* (2013.01)

(58) Field of Classification Search
CPC .................. H04N 21/4314; H04N 21/4821
(Continued)

(56) References Cited

U.S. PATENT DOCUMENTS

| 5,903,314 A | 5/1999 | Niijima et al. |
| 6,611,277 B1 * | 8/2003 | Miyazaki .............. G06F 3/0482 348/E5.105 |

(Continued)

FOREIGN PATENT DOCUMENTS

| JP | 2001245233 A | 9/2001 |
| JP | 2007516496 A | 6/2007 |

(Continued)

OTHER PUBLICATIONS

International Search Report corresponding to Application No. PCT/JP2015/057466; dated Apr. 14, 2015, with English translation.
(Continued)

*Primary Examiner* — Michael B Pierorazio
(74) *Attorney, Agent, or Firm* — Cantor Colburn LLP

(57) ABSTRACT

A terminal device includes a reception unit that receives from a video distribution device, a video gallery display Screen in which display images of Video data items transmitted from transmission Source devices are arranged by group, a display unit that has a display region to display a part of the video gallery display Screen; and a control unit that controls the display of the display unit wherein according to an instruction to designate a display target region in the Video gallery display Screen, the control unit changes the number of the display images of the video data items displayed in the display range in the video gallery display Screen, and according to the number of the display images displayed in the display range, the control unit changes
(Continued)

difference among groups in a degree of identification display which is determined for each group so as to identify the group.

6 Claims, 19 Drawing Sheets

(58) Field of Classification Search
 USPC .......................................................... 725/37
 See application file for complete search history.

(56) References Cited

U.S. PATENT DOCUMENTS

| | | | |
|---|---|---|---|
| 6,978,472 B1 * | 12/2005 | Nashida | H04N 5/4403 348/734 |
| 8,201,104 B2 * | 6/2012 | Yamamoto | A63F 13/10 348/E5.105 |
| 8,484,682 B2 * | 7/2013 | Inagaki | H04N 5/44591 725/44 |
| 8,732,582 B2 * | 5/2014 | Akaike | G06F 3/0481 715/730 |
| 2001/0042247 A1 | 11/2001 | Inoue | |
| 2008/0276280 A1 * | 11/2008 | Nashida | H04N 5/44543 725/48 |
| 2013/0036438 A1 | 2/2013 | Kutaragi et al. | |
| 2015/0195619 A1 * | 7/2015 | Choi | H04N 21/8173 725/40 |

FOREIGN PATENT DOCUMENTS

| | | |
|---|---|---|
| JP | 2007282276 A | 10/2007 |
| JP | 2011072029 A | 4/2011 |
| JP | 2011103522 A | 5/2011 |
| WO | 2004102285 A2 | 11/2004 |
| WO | 2011126134 A1 | 10/2011 |

OTHER PUBLICATIONS

Written Opinion of the International Searching Authority corresponding to Application No. PCT/JP2015/057466; dated Apr. 14, 2015, with English translation.

* cited by examiner

TERMINAL DEVICE, VIDEO DISTRIBUTION DEVICE, AND PROGRAM

CROSS REFERENCE TO RELATED APPLICATIONS

This is the U.S. national stage of application No. PCT/JP2015/057466 filed on Mar. 13, 2015. Priority under 35 U.S.C. § 119(a) and 35 U.S.C. § 365(b) is claimed from Japanese Application No. 2014-060803 filed on Mar. 24, 2014, the disclosure of which is also incorporated herein by reference.

BACKGROUND ART

In recent years, according to the spread of the Internet and the progress of the broadband for access lines, a technique to distribute a recorded video via the Internet has been watched with interest. For example, in a technique disclosed in Patent Document 1, a plurality of cameras are arranged to prepare distribution of a plurality of videos, so that a user can select a desired video. In this technique, the user can receive the selected and distributed video.

PRIOR ART DOCUMENT

Patent Document

Patent Document 1: Japanese Unexamined Patent Application, First Publication No. 2011-103522.

DISCLOSURE OF INVENTION

Problem to be Solved by the Invention

Conventionally, the user selects and watches a video that interests the user while looking at reduced display items (thumbnails) or titles. However, when there are too many options, checking the reduced display items or titles one by one and selecting a video that interests the user or suits the taste of the user is often complicated for the user.

In light of the above circumstances, an object of the present invention is to provide a terminal device, a video distribution device, and a program, by which a target video for watching can be easily selected from among a plurality of videos.

Means for Solving the Problem

In order to solve the above problem, the terminal device of the present invention comprises:

a reception unit that receives from a video distribution device, a video gallery display screen in which display images of video data items transmitted from transmission source devices are arranged by group;

a display unit that has a display region to display a part of the video gallery display screen; and a control unit that controls the display of the display unit wherein:

according to an instruction to designate a display target region in the video gallery display screen, the control unit changes the number of the display images of the video data items displayed in the display range in the video gallery display screen; and according to the number of the display images displayed in the display range, the control unit changes difference among groups in a degree of identification display which is determined for each group so as to identify the group.

In the terminal device of the present invention, any one or two or more of brightness, hue, and gradation for the display images can be used as the identification display.

Additionally, in the terminal device of the present invention, the control unit may control the display in a manner such that the difference among the groups in the degree of the identification display increases as the number of the display images included in the display region increases according to an input operation.

In addition, in the terminal device of the present invention, to a video having a high degree of attention determined according to an access status from terminal devices to the video distribution device, the control unit may apply a different type of the identification display other than those applied to the groups.

Furthermore, in the terminal device of the present invention, the control unit may accept an input operation to select a group as a display target among the groups and make the display images of videos belonging to the selected group be displayed as targets in the display region.

The video distribution device of the present invention comprises:

a video gallery display screen generation unit that generates a video gallery display screen by arranging display images of video data items by group, which are received from transmission source devices;

a processing unit that processes the video gallery display screen by changing the number of the display images of the video data items as display targets to be displayed in a display region of the video gallery display screen in response to a request from a terminal device, where according to the number of the display images of videos displayed in the display range, the control unit changes difference among the groups in a degree of identification display which is determined for each group so as to identify the group; and a distribution unit that distributes the processed video gallery display screen to the terminal device.

The program of the present invention makes a computer function as the above-described terminal device.

Effect of the Invention

As described above, in accordance with the present invention, for a video gallery display screen in which video data items are arranged by group, according to an instruction to designate a range of the video gallery display screen, which is displayed in a display region as a display target, the number of the display images which indicate the video data items to be displayed in the display region of the video gallery display screen is changed, and the degree of the identification display for each group is changed according to the number of the display images which indicate the videos to be displayed in the relevant display region.

In accordance with the above structure, when the screen of each video is watched in the video gallery display screen, the degree of the identification display is changed for each group according to the increase or decrease of the number of the display images which indicate the videos to be displayed in the video gallery display screen. Therefore, the display images of the videos for each group are displayed according to the degree of the identification display in response to the increase or decrease of the number of the display images which indicate the videos to be displayed in the video gallery screen. Accordingly, when the number of the display images which indicate the videos in the display region increases, a target video for watching can be selected with reference to the display images which are displayed by group with the degree of the identification display according to the number of the display images. In contrast, when the number of the display images which indicate the videos decreases, the display images are displayed by group with the degree of the identification display according to the number of the display images, and a video can be selected from among a small number of options, and thus video selection can be easily performed.

MODE FOR CARRYING OUT THE INVENTION

Below, an embodiment of the present invention will be explained with reference to the drawings.

Figure 1:
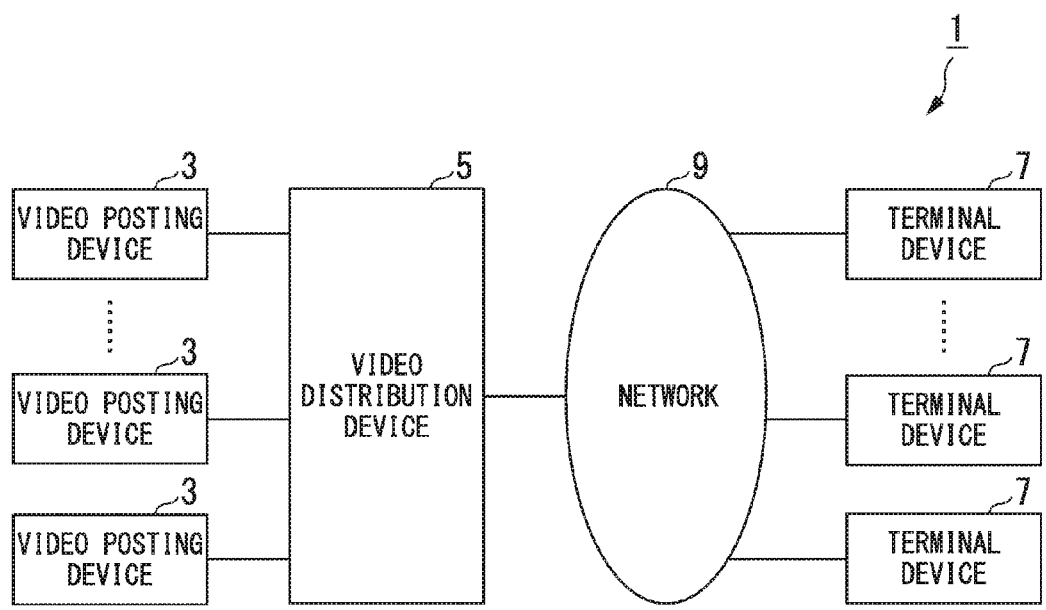
FIG. 1 is a block diagram showing the configuration of a video distribution system according to an embodiment of the present invention.

FIG. 1 is a block diagram showing a configuration of a video distribution system 1 according to the present embodiment. As shown in FIG. 1, the video distribution system 1 has video posting devices 3, a video distribution device 5, and terminal devices 7. The video distribution device 5 is connected to the terminal devices 7 via a network 9 such as the Internet. In addition, the distribution device 5 may be connected to part or all of the video posting devices 3 via the network 9.

Each video posting device 3 may be a smartphone, a tablet terminal, a computer terminal such as a personal computer, each of which has a camera, or a camera to which a communication device is connected.

Figure 2:
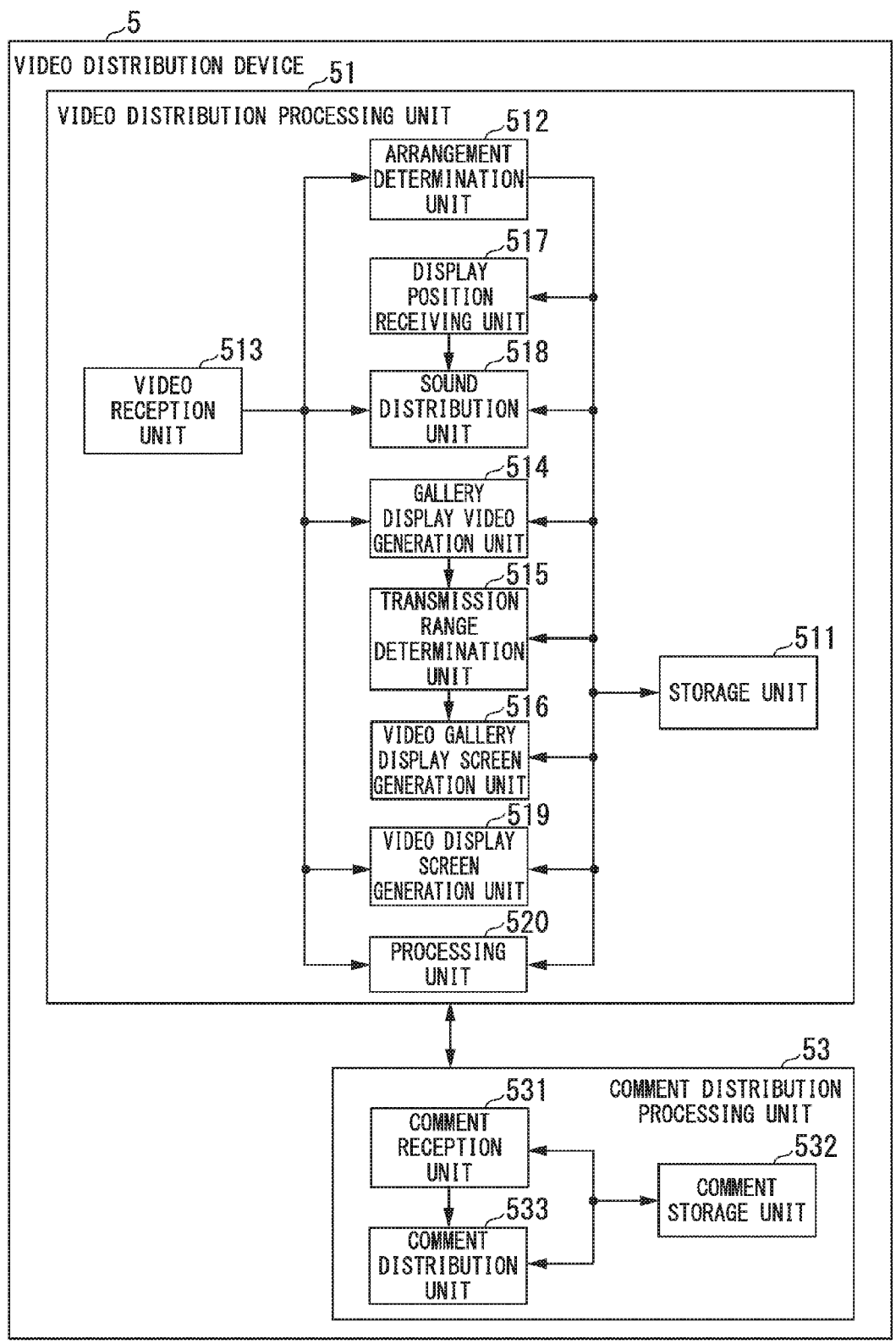
FIG. 2 is a block diagram that shows the internal structure of a video distribution device in the embodiment.

FIG. 2 is a functional block diagram that shows an internal structure of the video distribution device 5, where only functional blocks pertaining to the present embodiment are extracted to be shown. The video distribution device 5 may be implemented by one or more server computers and includes a video distribution processing unit 51 and a comment distribution processing unit 53.

The video distribution processing unit 51 has a storage unit 511, an arrangement determination unit 512, a video reception unit 513, a gallery display video generation unit 514, a transmission range determination unit 515, a video gallery display screen generation unit 516, a display position receiving unit 517, a sound distribution unit 518, and a video display screen generation unit 519.

The storage unit 511 stores various data such as video gallery data. The video gallery data is data which indicates the arrangement of video data when display images which indicate video data items are shown in a gallery form in which they are connected together and spread on a plane. The arrangement determination unit 512 determines the arrangement of the individual video data when the display images of the video data items are shown in the gallery form. The arrangement determination unit 512 stores the video gallery data, which indicates the determined arrangement, in the storage unit 511.

The video reception unit 513 receives video data from each video posting device 3. From the video data received by the video reception unit 513, the gallery display video generation unit 514 generates video data whose size matches to a display size on the video gallery display screen. The video gallery display screen is data of a screen whose size is greater than the display size of a display provided by the terminal device 7, where display images of video data items are included in the size of the display of the terminal device 7.

The transmission range determination unit 515 determines a transmission range for the video gallery data to be a size greater than the possible display range of the terminal device 7. When the transmission range determination unit 515 receives information about a display position on the video gallery display screen from the terminal device 7, the transmission range determination unit 515 determines the transmission range according to the received information.

The video gallery display screen generation unit 516 generates a video gallery display screen, in which display images of video data items within the transmission range determined by the transmission range determination unit 515 are arranged according to the arrangement defined by the video gallery data. The video gallery display screen generation unit 516 distributes the generated video gallery display screen to the terminal device 7. The video gallery display screen generation unit 516 may also generate the video gallery display screen in which video items received from the individual devices, which transmitted the video items, are arranged by group. The display position receiving unit 517 receives, from the terminal device 7 that displays the video gallery display screen, information utilized to identify video data whose display image is shown at a predetermined display position. The sound distribution unit 518 distributes sound data of the video data identified by the information received by the display position receiving unit 517.

The video display screen generation unit 519 receives a video data display request from each terminal device 7 and generates a video display screen on which the size of the image of the video data as a display target indicated by the received display request is greater than the size of the display image on the video gallery display screen. The video display screen generation unit 519 distributes the generated video display screen to the terminal device 7. On this video display screen, part of the image of other video data adjacent to the video data as the display target is cut by the outer periphery of the screen.

In response to a request from the terminal device, a processing unit 520 changes the number of target videos to be displayed in a display region in the video gallery display screen. In accordance with the number of the display images which indicate videos displayed in the relevant display region, the processing unit 520 processes the video gallery display screen in a manner such that the degree of "identification display" is changed, where the degree is determined for each group. The processing unit 520 distributes the processed video gallery display screen to the terminal device.

The comment distribution processing unit 53 has a comment reception unit 531, a comment storage unit 532, and a comment distribution unit 533.

The comment reception unit 531 receives comment data for the video data as the display target, from the terminal device 7 to which the video display screen generation unit 519 distributes the video display screen. The comment data includes the content of a comment, information utilized to identify the user who posted the comment, comment posting time, and the like. The comment storage unit 532 stores the comment data received by the comment reception unit 531. The comment distribution unit 533 distributes, to the terminal device 7 to which the video display screen generation unit 519 distributes the video display screen, comment information for the video data as the display target of the video display screen. The comment distribution unit 533 generates the comment information according to the comment data stored in the comment storage unit 532. The comment information includes the content of the comment, information (e.g., user name) about the user who posted the comment, the posting time, and the like.

Figure 3:
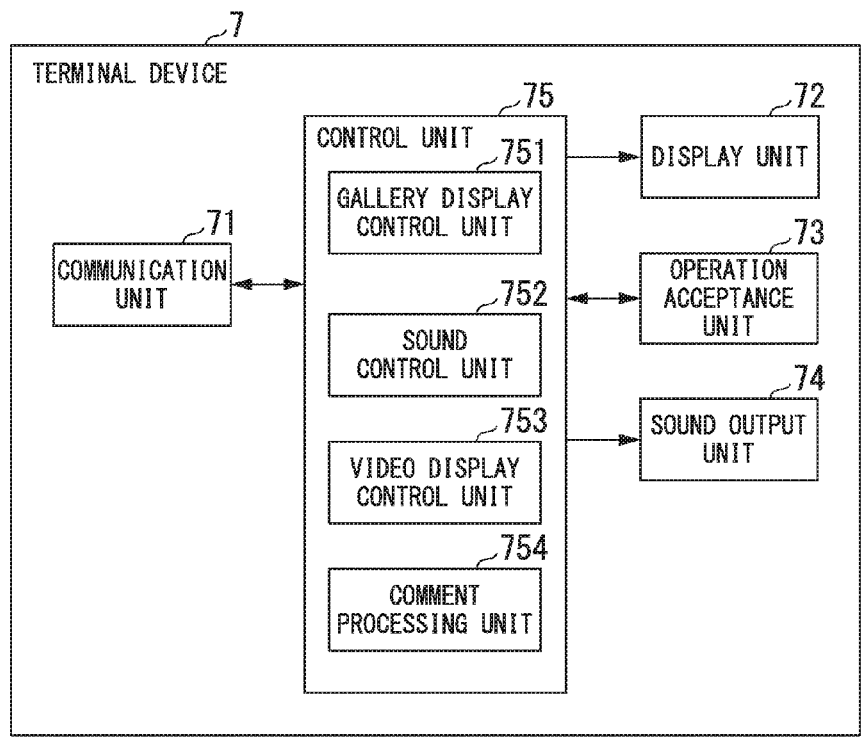
FIG. 3 is a block diagram showing the internal structure of a terminal device in the embodiment.

FIG. 3 is a functional block diagram showing the internal structure of each terminal device 7, where only functional blocks pertaining to the present embodiment are extracted to be shown. The terminal device 7 is implemented by a smartphone, a tablet terminal, a cellular phone, or a computer terminal such as a personal computer. In the present embodiment, the terminal device 7 is a smartphone as an example. The terminal device 7 has a communication unit 71, a display unit 72, an operation acceptance unit 73, a sound output unit 74, and a control unit 75.

The communication unit 71 communicates with the video distribution device 5 via the network 9.

The communication unit 71 also receives from the video distribution device, a video gallery display screen in which video data items transmitted from individual devices, which transmitted the relevant videos, are arranged by group.

The display unit 72 is a display on which a screen is displayed. The display unit 72 may be a touch panel. The operation acceptance unit 73 accepts various operations of the user. When the display unit 72 is a touch panel, the operation acceptance unit 73 accepts the operations via touch sensors arranged in the touch panel. The sound output unit 74 is a speaker to output reproduced sound of sound data.

The control unit 75 controls the individual units and includes a gallery display control unit 751, a sound control unit 752, a video display control unit 753, and a comment processing unit 754.

The gallery display control unit 751 displays on the display unit 72, a display range on the video gallery display screen whose size is greater than the display size of the display unit 72, where the display range corresponds to the display size of the display unit 72, and the display range is moved according to a display movement operation.

In accordance with an instruction to designate a range in the video gallery display screen, that is, a display range corresponding to the display region as a display target, the gallery display control unit 751 changes the number of video data items displayed in the display region of the video gallery display screen. In accordance with the number of the display images which indicate videos displayed in the relevant display region, the gallery display control unit 751 changes the degree of the identification display, the degree being determined for each group, and implements the relevant display by using the display unit 72. The identification display may have types of brightness, hue, gradation, resolution, and the like, of the display image which indicates each video, where one or a combination (i.e., two or more) of these items may be utilized. When the degree of the identification display for each group is changed, the gallery display control unit 751 controls the display unit 72 in a manner such that difference in the degree of the identification display among the groups increases as the number of the display images which indicate the videos included in the display region increases according to an input operation. More specifically, the gallery display control unit 751 performs the display control in a manner such that the smaller the display size of the display images which indicate the individual video data items displayed in the video gallery display screen, the greater the difference in the degree of hue or brightness among the groups. The groups may be determined using a category assigned to each video data item. For example, individual categories correspond to different groups.

Additionally, in accordance with the degree of attention according to an access status from the terminal devices 7 to the video distribution device 5, the gallery display control unit 751 makes the display unit 72 display a video, which has a high degree of attention, in an identification display manner other than those for the groups. As the degree of attention, the followings may be utilized: (i) the number of comments transmitted from the terminal devices 7, (ii) the number of comments transmitted from the terminal devices 7 for the video, where the comments each include a specific keyword (e.g., "not interesting" or "boring" which is a character string having a meaning to criticize the content of the video), and (iii) the number of users who watch the video.

The gallery display control unit 751 accepts an input operation to select one of the groups, which is a display target, and displays videos, which belong to the selected group, in the display region of the display unit 72.

Within the display range (displayed by the display unit 72) on the video gallery display screen, the sound control unit 752 receives sound data of the video data, whose display image is displayed at a predetermined position, from the video distribution device 5 and makes the sound output unit 74 output the sound data.

When the operation acceptance unit 73 accepts a display instruction operation to select the video data as the display target by using the display image of the video data on the video gallery display screen displayed by the display unit 72, the video display control unit 753 transmits a display request for the video data selected as the display target to the video distribution device 5.

Additionally, when the video display control unit 753 receives a display target change operation to change the video data, whose part of the image is cut by the outer periphery of the video display screen, to a new display target, the video display control unit 753 transmits a display request for the video data selected as the new display target to the video distribution device 5.

The video display control unit 753 makes the display unit 72 display a video display screen received from the video distribution device 5 in response to the display request.

The comment processing unit 754 transmits comment data, in which the content of the comment input by the user for the video data as the display target on the video display screen is defined, to the video distribution device 5. The comment processing unit 754 also displays the comment information, received from the video distribution device 5, on the video display screen as additional information.

Next, the operation of the video distribution system 1 will be explained. In the following case, the video distribution device 5 performs live distribution of video data, which are received from the video posting devices 3, to the terminal devices 7.

First, an operation performed when the video distribution device 5 receives video data for the live distribution from each video posting devices 3 will be explained.

First, in accordance with a predetermined condition, the arrangement determination unit 512 of the video distribution device 5 determines the arrangement of video data when the display images of the video data items are shown in the gallery form. The arrangement determination unit 512 registers the video gallery data, which indicates the determined arrangement, with the storage unit 511. For example, the video gallery data is information in which each arrangement position in the video gallery corresponds to a video ID of video data, whose display image is displayed at the arrangement position. The predetermined condition may be any information pertaining to the video data. For example, category information which indicates the category assigned to each video may be utilized. Additionally, the timing of generating the video gallery data is any timing such as at regular intervals, or when an instruction is input.

Figure 4:
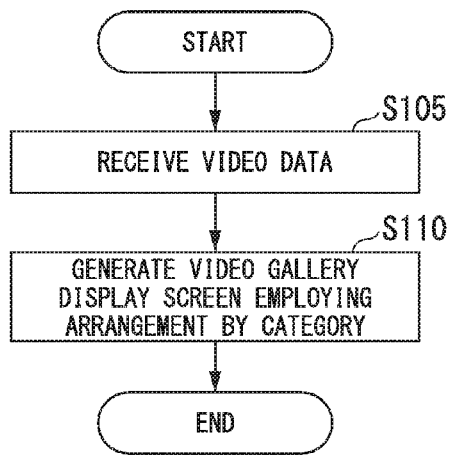
FIG. 4 is a flowchart showing a video receiving operation of the video distribution device in the embodiment.

FIG. 4 is a diagram showing the flow of a video receiving operation in the video distribution device 5.

The video reception unit 513 of the video distribution device 5 receives video data for the live distribution from the video posting device 3 (see FIG. 4, step S105). According to the video data received by the video reception unit 513, the gallery display video generation unit 514 refers to the category information of the video data and generates video data whose size matches to the display size of the display image on the video gallery display screen, where the display screens of the generated video data items are arranged by category (see FIG. 4, step S110). The category information is associated with the video data, where the category information transmitted by each video posting device 3 may be received and used. In another example, a category information storage part may be provided in the storage unit 511 so as to associate the user ID utilized to identify the user of each video posting device 3 with the category information and store the associated information. The category information storage part may be referred to according to the user ID obtained, for example, when the video posting device 3 executes log-in to receive the video distribution, and the category information associated with the user ID may be used.

In the present embodiment, although the display images on the video gallery display screen have the same size, they may have different sizes in accordance with the arrangement positions in the video gallery. The video data suited for the display size of the display image on the video gallery display screen may be video data of a reduced display image or video data whose part of the display image is trimmed.

Next, by using operation flows shown in FIGS. 5 and 6, a video gallery distribution operation in the video distribution system 1 will be explained.

Figure 5:
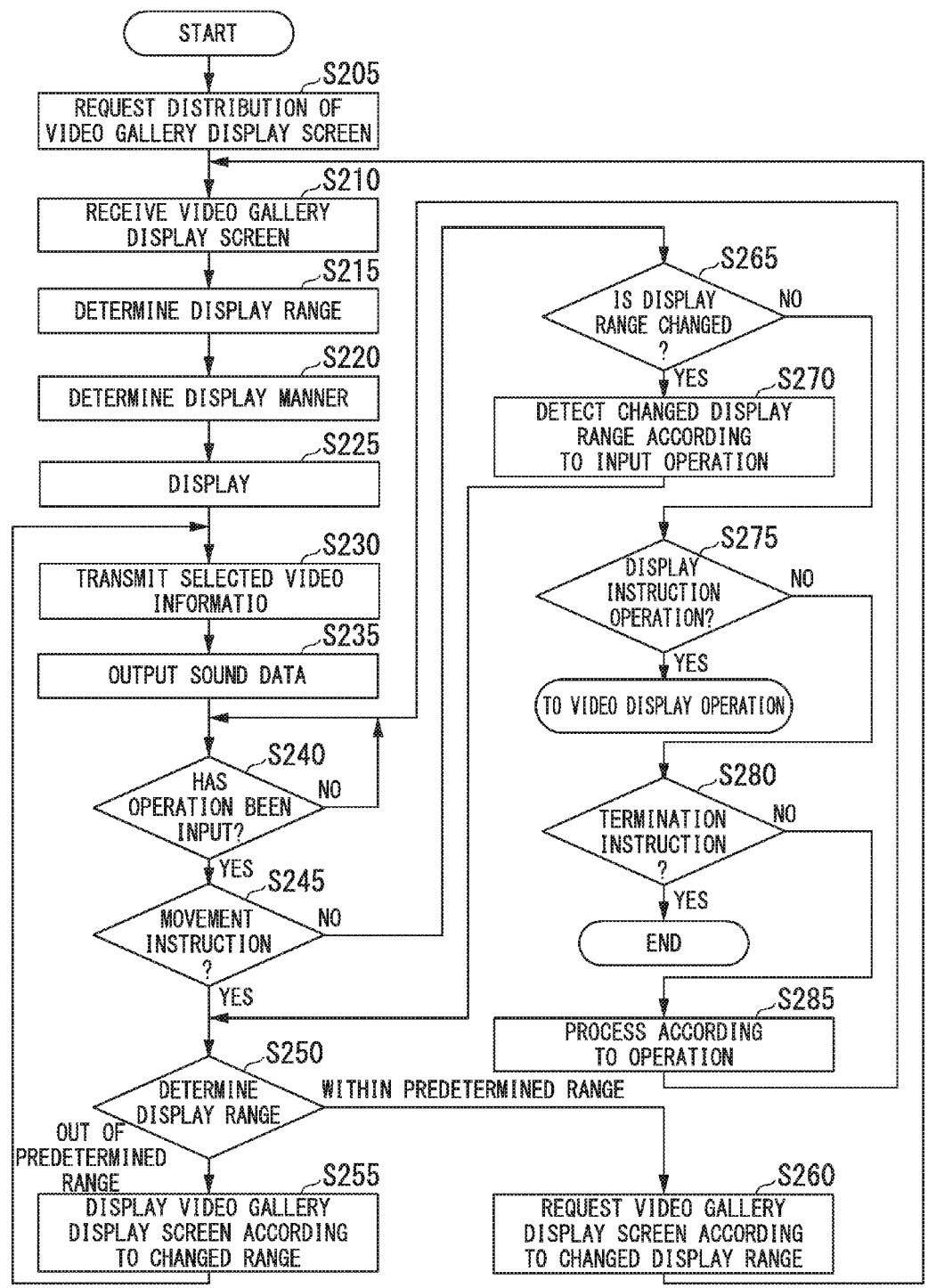
FIG. 5 is a flowchart showing a video gallery display operation of the terminal device in the embodiment.
Figure 6:
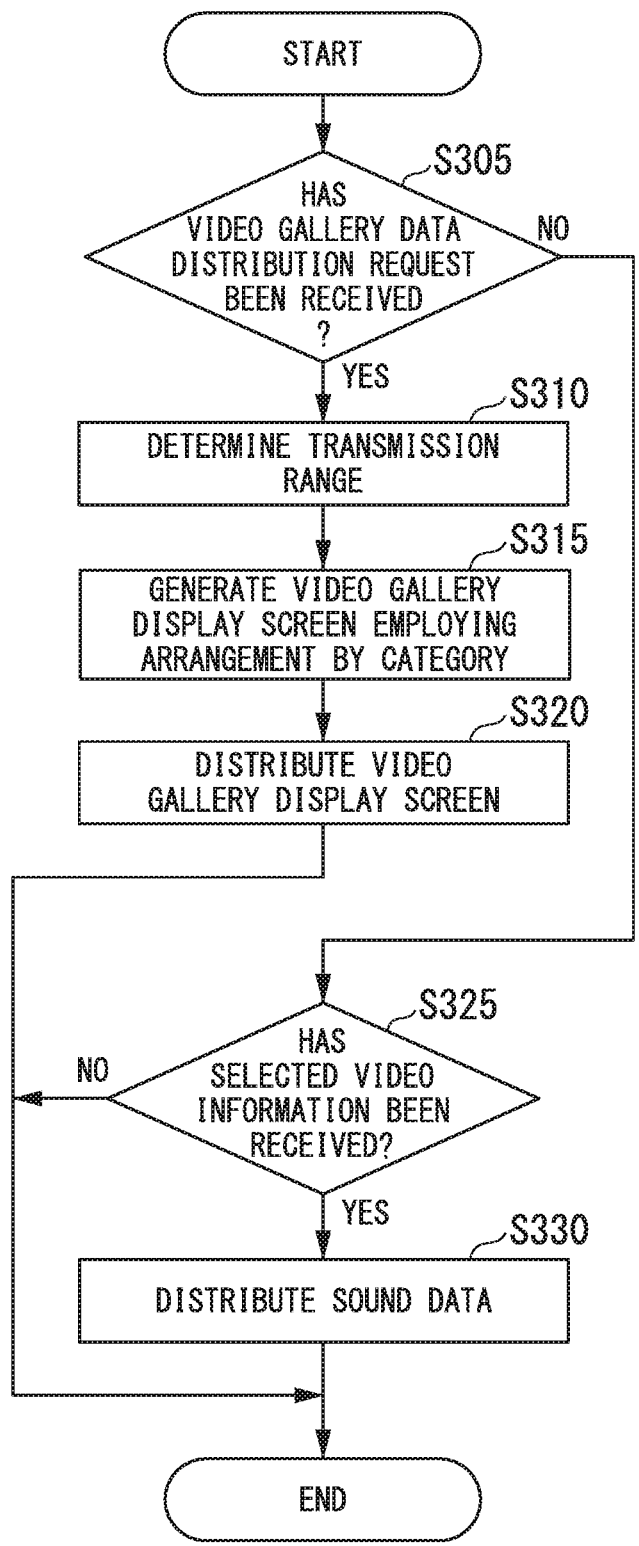
FIG. 6 is a flowchart showing a video gallery distribution operation of the video distribution device in the embodiment.

FIG. 5 is a diagram showing a video gallery display operation flow performed by the terminal device 7 and FIG. 6 is a diagram showing a video gallery distribution operation flow performed by the video distribution device 5.

In FIG. 5, the operation acceptance unit 73 in the terminal device 7 accepts a user operation to request the distribution of the video gallery data. The gallery display control unit 751 transmits a video gallery data distribution request corresponding to this user operation, to the video distribution device 5 (see FIG. 5, step S205).

In FIG. 6, the transmission range determination unit 515 of the video distribution device 5 determines whether or not the video gallery data distribution request has been received from the terminal device 7 (see FIG. 6, step S305). Here, the transmission range determination unit 515 determines that the video gallery data distribution request has been received (i.e., "YES" in step S305 in FIG. 6). From the video gallery data distribution request, the transmission range determination unit 515 obtains the display position of the video gallery at the terminal device 7. Since no display position is set in the video gallery data distribution request, the transmission range determination unit 515 sets the display position to a predetermined initial position in the video gallery. The transmission range determination unit 515 retrieves the video gallery data from the storage unit 511, and determines, in accordance with the display position, a rectangular transmission range in the retrieved video gallery data, where the range has a size greater than the possible display range of the terminal device 7 by a predetermined value (see FIG. 6, step S310).

Figure 7:
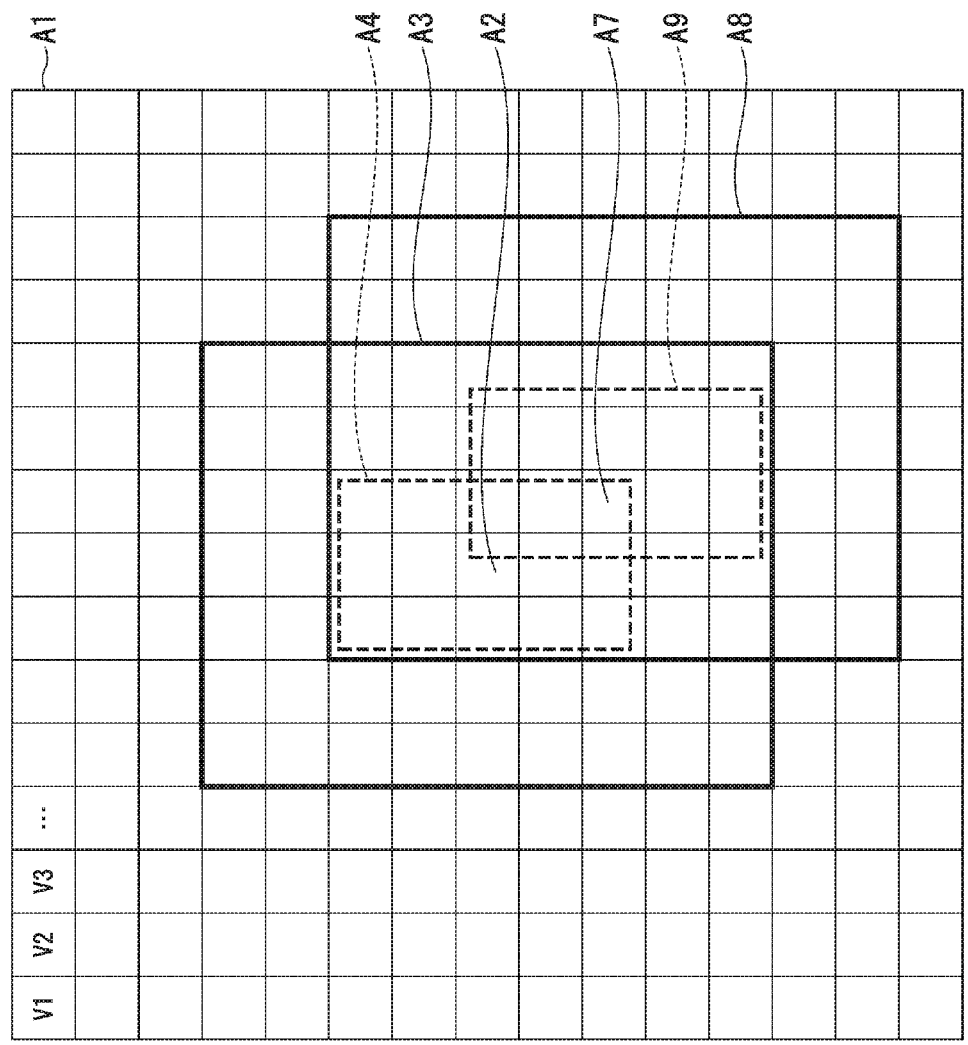
FIG. 7 is a diagram showing a relationship among the video gallery data, the distribution range, and the display range of the terminal device in the embodiment.

FIG. 7 is a diagram showing a relationship among the video gallery data, the distribution range, and the display range of the terminal device 7. In the present embodiment, the video gallery data indicates the gallery arrangement of video data when square display images having the same size are arranged in a tiling manner in the horizontal and vertical directions.

As shown in FIG. 7, the video gallery data indicates that video data items having video IDs V1, V2, V3, . . . are arranged from the upper-left corner. A virtual screen A1 represents the entire screen when the display images are virtually arranged and displayed according to the arrangement indicated by the video gallery data. For example, the transmission range determination unit 515 determines a transmission range A3 so that an initial display position A2 is the center of A3. The transmission range A3 is a range of the video gallery as the video gallery display screen transmitted to the terminal device 7 and is greater than a display range A4 which is the possible display size of the display unit 72 of the terminal device 7.

Here, for the display images of the video data items in the video gallery display screen, part of each outermost display image included in the display range A4 is cut by the outer periphery of the display range A4. That is, the longitudinal and lateral lengths of the display range A4 are each not divisible by the lengths of the corresponding sides of the display image.

In FIG. 6, the video gallery display screen generation unit 516 reads out the video IDs corresponding to individual arrangement positions included in the transmission range (e.g., transmission range A3 in FIG. 7) determined by the transmission range determination unit 515. The video gallery display screen generation unit 516 generates the video gallery display screen on which the display images of the video data items are arranged by category at the arrangement positions included in the transmission range, where the video data items are generated by the gallery display video generation unit 514 from the video data items of the video IDs corresponding to the arrangement positions (see FIG. 6, step S315). In the video gallery display screen, any one or two or more of information which indicates the arrangement position of the display image of each video data item in the video gallery data; information (e.g., video ID) utilized to identify the video data item; and category information associated with each video ID are added to the display image of the video data item. The gallery display video generation unit 514 distributes the generated video gallery display screen to the terminal device 7 which transmitted the video gallery data distribution request (see FIG. 6, step S320).

In FIG. 5, the gallery display control unit 751 of the terminal device 7 receives the video gallery display screen from the video distribution device 5 (see FIG. 5, step S210). For the received video gallery display screen, the gallery display control unit 751 determines a display range to be displayed at the display unit 72 (see FIG. 5, step S215).

Figure 8:
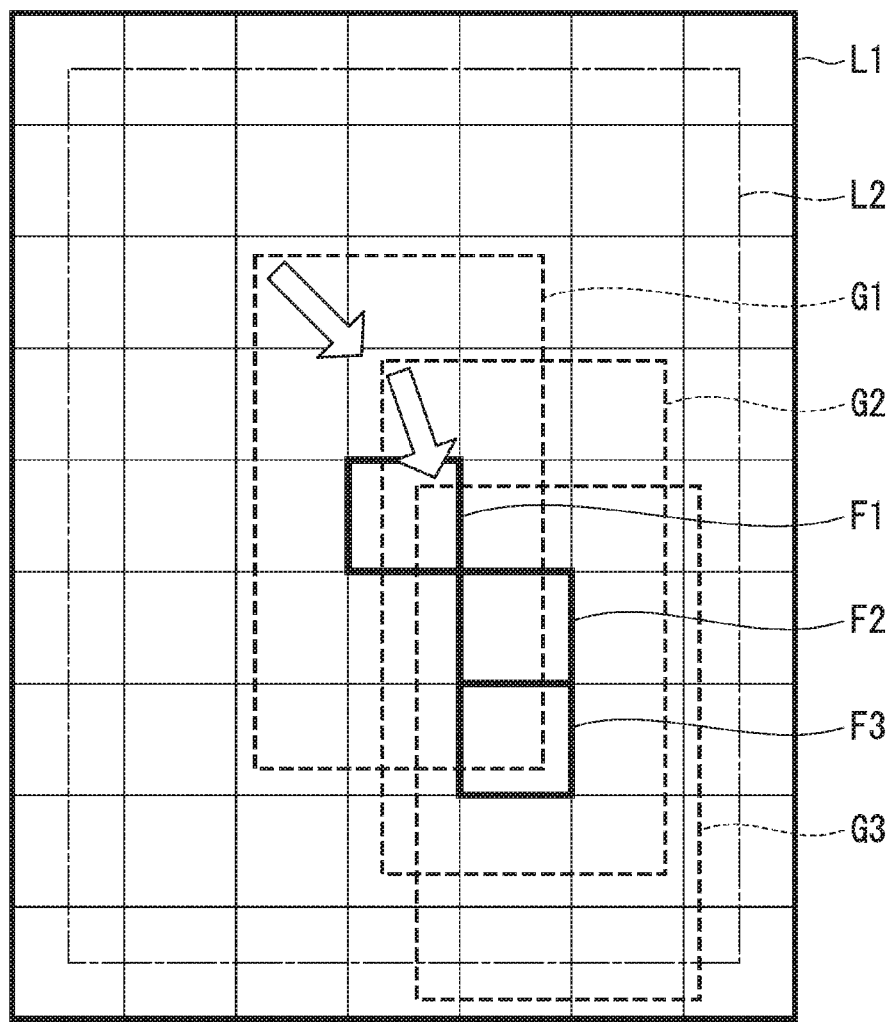
FIG. 8 is a diagram which shows a display range for display by the display unit of the terminal device in the embodiment.

FIG. 8 is a diagram which shows a display range for display by the display unit 72 of the terminal device 7. The gallery display control unit 751 may determine a display range G1 in a manner such that the center of a received video gallery display screen L1 is the center of this display range. The gallery display control unit 751 also determines video data, whose display image is displayed at a predetermined display position within the display range G1, to be currently selected video data. For example, the gallery display control unit 751 determines video data, whose display image is displayed at a display position F1 which includes the center of the display range, to be the currently selected video data.

In FIG. 5, when the display range is determined, the gallery display control unit 751 of the terminal device 7 determines the manner of the identification display (see FIG. 5, step S220). For example, for each category information item assigned to each video data item, a different degree of identification display is determined. The categories may include sports, cars, trains, cooking, anime, karaoke, playing musical instruments, and the like. As the identification display manner, when brightness is used, the degree of brightness (identification display) is determined in a manner such that the display image of video data associated with the category of sports has the highest brightness, and the brightness of the display images of video data associated with cars, trains, cooking, anime, karaoke, and playing musical instruments are gradually reduced in this order.

In accordance with the degree of brightness according to the size of the display range, the gallery display control unit 751 makes the display unit 72 display the video gallery display screen included in the display range (see FIG. 5, step S225), where information is added to the display image of the currently selected video data so as to indicate the currently selected state. The currently selected video data is determined such that the display screen of video data, which is arranged to include the center position of the display range, is currently selected.

Figure 9:
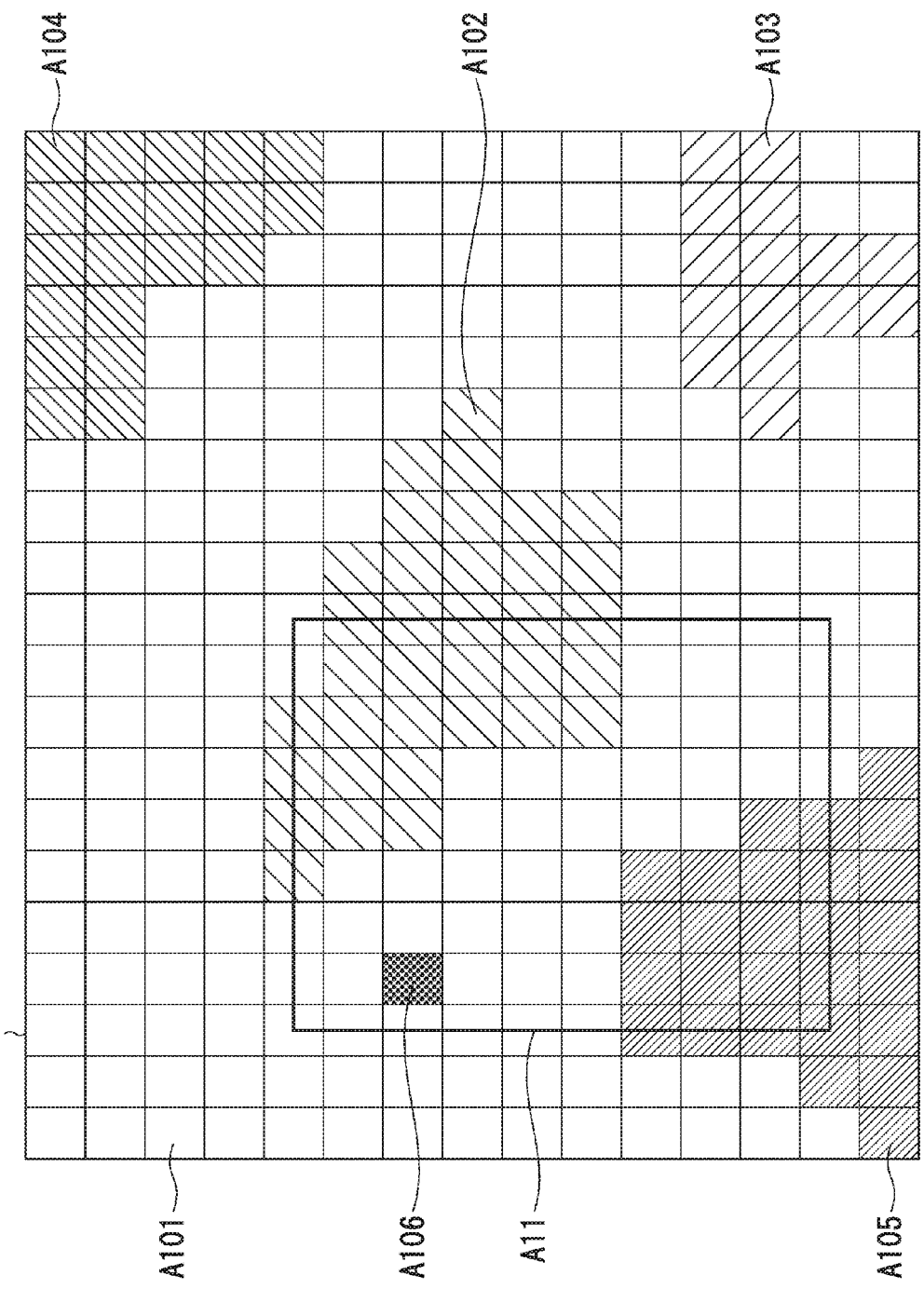
FIG. 9 is a diagram utilized to explain a case in which on the video gallery display screen, individual categories have different degrees of identification display.

FIG. 9 is a diagram utilized to explain a case in which on the video gallery display screen, individual categories have different degrees of identification display.

A virtual screen A10 represents a video gallery display screen. In this video gallery display screen, a range in which the display screens for video data items belonging to a category of sports are arranged (see reference numeral A101); a range in which the display screens for video data items belonging to a category of cars are arranged (see reference numeral A102); a range in which the display screens for video data items belonging to a category of trains are arranged (see reference numeral A103); a range in which the display screens for video data items belonging to a category of cooking are arranged (see reference numeral A104); and a range in which the display screens for video data items belonging to a category of anime are arranged (see reference numeral A105) are arranged by category. Additionally, although they are not included in the virtual screen A10, video data items transmitted from the video posting devices 3 are arranged at positions adjacent to the outer periphery of the virtual screen A10.

Additionally, in this example, video data items belonging to each category other than the sports are arranged as one group, and video data items belonging to the sports are arranged in the remaining positions where video data items other than the sports are not arranged, so that the video data items for the sports can be recognized as one group.

Also in this example, the display screen for video data having a high degree of attention is displayed in an identification display manner other than that for the categories (see reference numeral A106). For example, such video data having a high degree of attention is displayed by utilizing, not brightness, but hue so that the image of the relevant video data has a value of hue other than that for the display images of the other video data items. For example, only the display screen of the video data having a high degree of attention has a hue closer to red. In another example, the display screen of the video data having the highest degree of attention has a hue closer to red while the display screen of the video data having the lowest degree of attention has a hue closer to blue.

Figure 10:
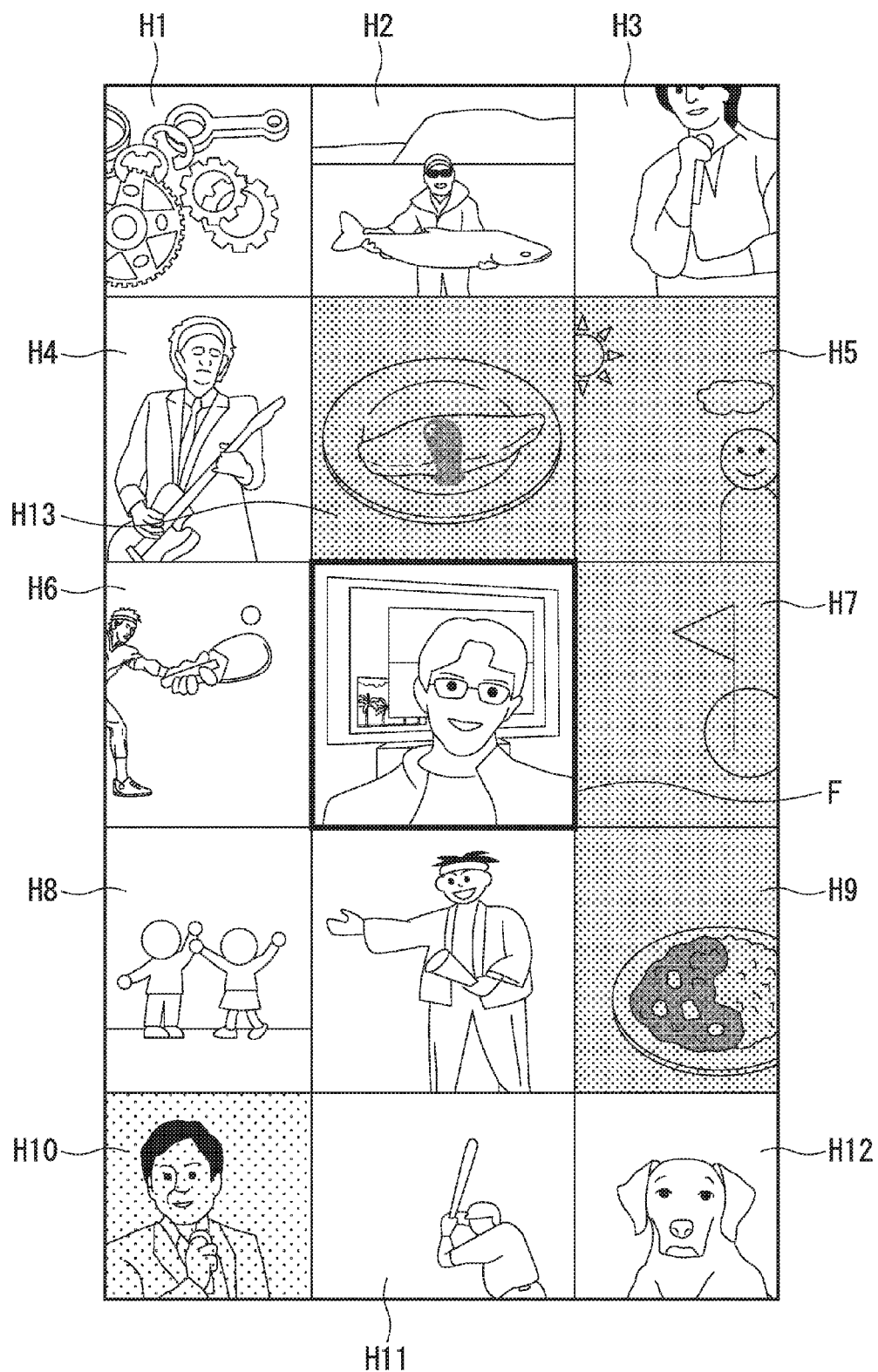
FIG. 10 is a diagram showing an example of the video gallery display screen displayed by the display unit of the terminal device in the embodiment.

FIG. 10 is a diagram showing an example of the video gallery display screen displayed by the display unit 72 of the terminal device 7. As shown in FIG. 10, the display unit 72 displays a display screen gallery of video data in which display images of video data items are arranged in a tiling manner in the horizontal and vertical directions. The outermost display images H1 to H12 are displayed by the display unit 72 in a manner such that part of each display image is cut by the outer periphery of the display range of the display unit 72 and thus part of images H1 to H12 are displayed. In addition, an outer frame F is applied to the center display image in the gallery so as to indicate that it is a display image of the currently selected video data. When the display images H5, H7, H9, and H13; the display screen H10; and the other display images belong to different categories, according to the degree of the identification display, the display images H5, H7, H9, and H13 have the lowest brightness (i.e., darkest), the display screen H10 has the next lower brightness (i.e., next darker), and the other display images have the highest brightness. Additionally, since a video is displayed on each of the relevant display screens, the display images which indicate videos are displayed over the display range.

As described above, since the degree of the identification display is changed for each category, the user can easily select a video that satisfies the user's interest or taste according to the degree of the identification display.

In addition, the outermost display images in the display range are displayed in a manner such that part of each outermost display image is cut. Therefore, it is possible to make the user recognize that there are further display images outside the display range and that the display range is movable. According to such a display, it is possible for the video providing site to spread out the gallery display and create a fun or cheerful experience for the user. It is also possible to attract the attention of the user for the display images outside the current display range.

Returning to FIG. 5, the sound control unit 752 of the terminal device 7 transmits selected video information, which is utilized to identify the currently selected video determined by the gallery display control unit 751, to the video distribution device 5 (see FIG. 5, step S230). To obtain the selected video information to be utilized, the sound control unit 752 may retrieve information, which indicates the arrangement position of the currently selected video data, or the video ID of video data, which is displayed together with the information that indicates the currently selected state, from the video gallery display screen. As another example, the user may input an operation of designating the currently selected video data from the operation acceptance unit 73. The sound control unit 752 transmits to the video distribution device 5, the selected video information utilized to identify the currently selected video which is designated according to the operation accepted by the operation acceptance unit 73.

In FIG. 6, when it is determined that the video gallery data distribution request has not been received (i.e., "NO" in step S305 in FIG. 6), the display position receiving unit 517 of the video distribution device 5 determines whether or not the selected video information has been received (see FIG. 6, step S325). If no selected video information has been received, the display position receiving unit 517 terminates the operation of the flow (i.e., "NO" in step S325 in FIG. 6). Here, it is assumed that the display position receiving unit 517 determines that the selected video information has been received from the terminal device 7 (i.e., "YES" in step S325 in FIG. 6). The display position receiving unit 517 distributes sound data of the video data, which is identified by the received selected video information, to the terminal device 7 which transmitted the selected video information (see FIG. 6, step S330).

In another example, the sound distribution unit 518 may generate superimposed sound data of the sound of the video data identified by the selected video information and the sound of each video data item whose display image is displayed in the vicinity of the above video data and transmit the superimposed sound data to the terminal device 7. In this case, the sound distribution unit 518 identifies the arrangement position of the currently selected video data in the video gallery according to the selected video information received by the display position receiving unit 517. The sound distribution unit 518 further identifies other video data items whose display images are arranged within a predetermined range from the arrangement position of the currently selected video data in the video gallery. The sound distribution unit 518 generates superimposed sound data of the sound of the currently selected video data and the sounds of the identified other video data items, where the volume of each sound is determined depending on the arrangement position in the video gallery display screen. The sound distribution unit 518 distributes the generated sound data to the terminal device 7.

Figure 11:
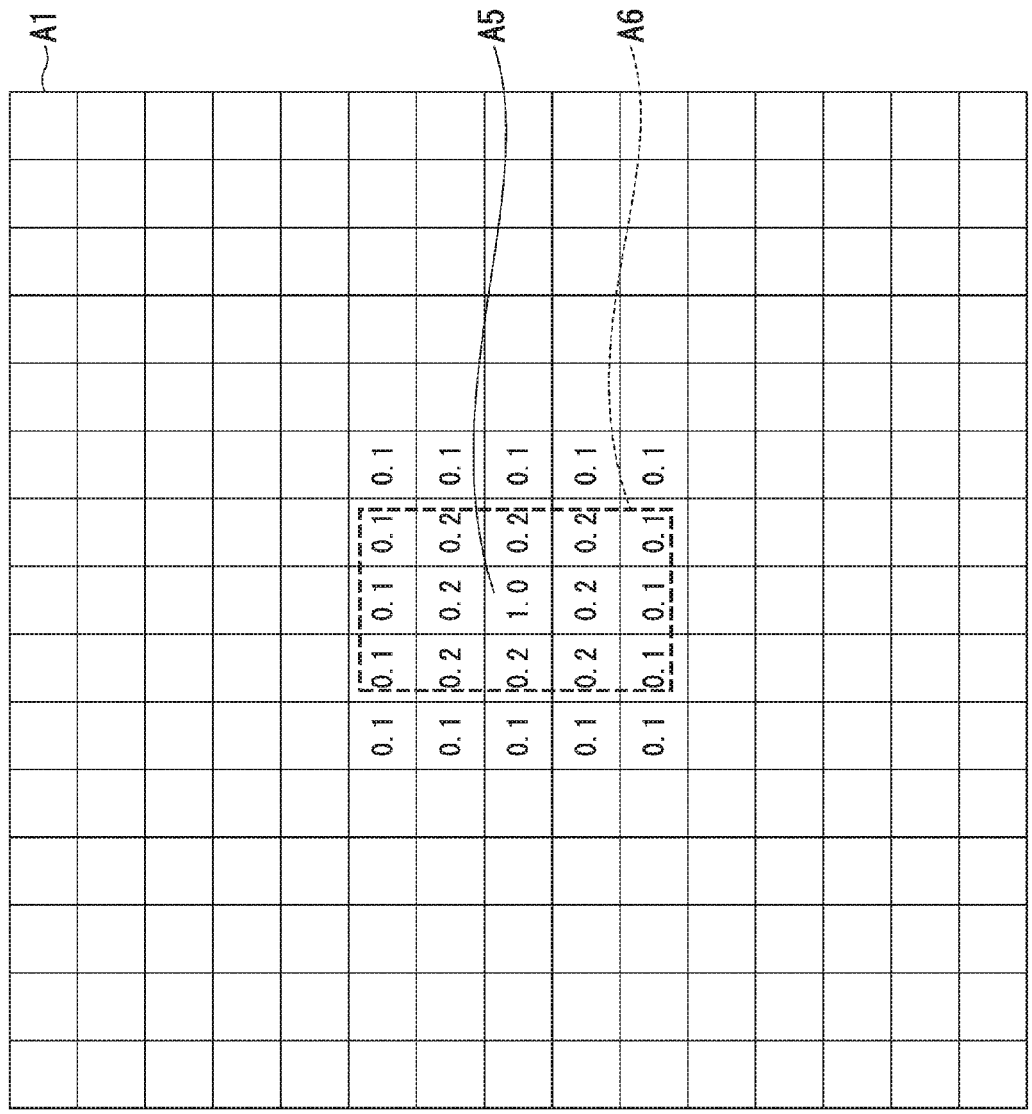
FIG. 11 is a diagram showing an example of the rate among superimposed sound data items in the embodiment.

FIG. 11 is a diagram showing an example of the rate among the superimposed sound data items. In FIG. 11, the sound distribution unit 518 determines the superimposition rate in a manner such that the sound data of the video data identified by the selected video information has the highest superimposition rate and that the longer the arrangement distance from this video data identified by the selected video information, the lower the superimposition rate. More specifically, when the volume for the currently selected video data is 1.0, the volume of the video data items arranged adjacent to the arrangement position A5 of the currently selected video data is 0.2, and the volume of the video data items which surround such adjacent items is 0.1. Here, sound data of video data at each arrangement position which has no numerical value has a superimposition rate of 0, that is, is substantially not superimposed.

The range and superimposition rate utilized to superimpose sound data of the video data items as targets are not limited. In FIG. 11, although sounds of some video data items outside a display range A6 of the terminal device 7 (i.e., sound data of video data items arranged outside the display range A6) are superimposed, sounds of only video data items whose display images are included in the display range A6 may be superimposed. In addition, the sound superimposition may be performed according to the category information so that sounds of video data belonging to the same category as that of the relevant display image may be superimposed.

As described above, not only the sound of the currently selected video in the gallery display at the terminal device 7, but also the sounds of the peripheral videos are superimposed to generate and output a superimposed sound. Therefore, it is possible for the video providing site to create a fun and cheerful experience for the user.

In FIG. 5, the sound control unit 752 of the terminal device 7 makes the sound output unit 74 output reproduced sound of the sound data received from the video distribution device 5 (see FIG. 5, step S235).

Next, the control unit 75 determines whether or not an operation has been input through the operation acceptance unit 73 (see FIG. 5, step S240). If no operation has been input (i.e., "NO" in step S240 in FIG. 5), the control unit 75 performs the video data display within the display range and the sound output and performs the determination whether or not an operation has been input after a predetermined period of time has elapsed (see FIG. 5, step S240).

In contrast, if an operation has been input through the operation acceptance unit 73 (i.e., "YES" in step S240 in FIG. 5), the control unit 75 determines whether or not the input content is a movement instruction utilized to change the display range (see FIG. 5, step S245). If the input operation indicates the movement instruction (i.e., "YES" in step S245 in FIG. 5), the gallery display control unit 751 performs relative movement between the display range and the video gallery display screen according to the direction and amount of movement input as the movement instruction. This movement operation of the display range is input by a swiping or flicking operation on the screen displayed by the display unit 72.

Next, the gallery display control unit 751 determines whether or not the display range after the change by the above relative movement has reached a predetermined range from the outer periphery of the video gallery display screen (see FIG. 5, step S250). In FIG. 8, a boundary L2 is away from the outer periphery of the video gallery display screen L1 by a predetermined distance. The boundary L2 is determined according to the size of the video gallery display screen. The gallery display control unit 751 determines whether or not part of the display range (e.g., G2) after the relative movement is included in a space between the outer periphery of the video gallery display screen L1 and the boundary L2. In this case, the display range G2 is within the range defined by the boundary L2, the gallery display control unit 751 determines that the display range after the relative movement has not reached the predetermined range from the outer periphery of the video gallery display screen, that is, out of the predetermined range (see "OUT OF PREDETERMINED RANGE" in step S250 in FIG. 5) and makes the display unit 72 display the video gallery display screen according to the display range after the change by the relative movement (see FIG. 5, step S255). In this process, the gallery display control unit 751 determines the display range G2 in a manner such that part of each outermost display image included in the display range G2 is cut by the outer periphery of the display range G2. Furthermore, the gallery display control unit 751 determines video data, whose display image is displayed at a display position F2, to be the currently selected video data, where the center of the display range G2 after the movement is included in F2. The gallery display control unit 751 displays the outer frame F, which indicates the currently selected video, by changing the target of the frame F from the display image at the display position F1 to the display image at the display position F2.

Next, the video distribution system 1 performs the operation from step S230 in FIG. 5. That is, the sound control unit 752 of the terminal device 7 transmits the selected video information, which is utilized to identify the currently selected video determined by the gallery display control unit 751, to the video distribution device 5 (see FIG. 5, step S230). The display position receiving unit 517 of the video distribution device 5 receives the selected video information (i.e., "NO" in step S305 and "YES" in step S325 in FIG. 6). The sound distribution unit 518 distributes sound data of the video data, which is identified by the selected video information, to the terminal device 7 (see FIG. 6, step S330). The sound control unit 752 of the terminal device 7 makes the sound output unit 74 output reproduced sound of the sound data received from the video distribution device 5 (see FIG. 5, step S235). The control unit 75 determines whether or not an operation has been input (see FIG. 5, step S240).

On the other hand, if the display range after the change by the relative movement has reached the predetermined range from the outer periphery of the video gallery display screen, that is, if it is determined that the display range has moved over the boundary L2 (see "WITHIN PREDETERMINED RANGE" in step S250 in FIG. 5), the gallery display control unit 751 transmits, according to the changed display range, the video gallery data distribution request, which includes information that indicates the display position of videos, to the video distribution device 5 (see FIG. 5, step S260).

The information that indicates the display position of videos may be a predetermined display position of the display range G3, for example, information which indicates the arrangement position of the display image that includes the center of the display range G3 or the video ID of the video data whose display image is displayed at the arrangement position. The information that indicates the display position of videos may also be information utilized to identify the display position that includes the center of the display range (e.g., display position F2 in the display range G3), the size of the display range, and the position of the display range with respect to the above display position.

In FIG. 6, the transmission range determination unit 515 of the video distribution device 5 receives the video gallery data distribution request from the terminal device 7 (i.e., "YES" in step S305 in FIG. 6). The transmission range determination unit 515 obtains the information that indicates the display position from the video gallery data distribution request. The transmission range determination unit 515 retrieves the video gallery data from the storage unit 511, and determines, in accordance with the display position indicated by the obtained information, a rectangular transmission range in the retrieved video gallery data, where the range has a size greater than the possible display range of the terminal device 7 by a predetermined value (see FIG. 6, step S310).

For example, as shown in FIG. 7, the transmission range determination unit 515 determines a transmission range A8 whose center corresponds to a display position A7 indicated by the information obtained from the video gallery data distribution request. The transmission range A8 has the same size as that of the transmission range A3 and includes at least the current display range A9 of the terminal device 7.

In FIG. 6, the video gallery display screen generation unit 516 reads out the video IDs corresponding to individual arrangement positions included in the transmission range determined by the transmission range determination unit 515. The video gallery display screen generation unit 516 generates the video gallery display screen on which the display images of the video data items are arranged by category and displayed at the arrangement positions included in the transmission range, where the video data items are generated by the gallery display video generation unit 514 from the video data items of the video IDs corresponding to the arrangement positions (see FIG. 6, step S315). The gallery display video generation unit 514 distributes the generated video gallery display screen to the terminal device 7 (see FIG. 6, step S320).

In FIG. 5, the gallery display control unit 751 of the terminal device 7 receives the new video gallery display screen from the video distribution device 5 (see FIG. 5, step S210). The gallery display control unit 751 determines the current display range on the received new video gallery display screen according to the display range after the movement (see FIG. 5, step S215). After the display range is determined, the gallery display control unit 751 determines the manner of the identification display according to the category information assigned to the video data (see FIG. 5, step S220) and implements the relevant display by using the display unit 72 (see FIG. 5, step S225). Then the sound control unit 752 identifies the currently selected video data, which is determined according to the position of the display range, and transmits the identified result as the selected video information to the video distribution device 5. Then the sound control unit 752 receives sound data superimposed according to the display range, which is transmitted from the video distribution device 5 in response to the selected video information, and outputs the sound data (see FIG. 5, step S235).

On the other hand, in step S245 of FIG. 5, if the input operation does not indicate the movement instruction (i.e., "NO" in step S245 in FIG. 5), the control unit 75 determines whether or not the input operation indicates a change of the display range (see FIG. 5, step S265). The input operation to change the display range may be an operation to enlarge or reduce the display size in the display range by using a pinch function, or an operation to press a button utilized to designate "enlargement" or "reduction". If it is determined that the input operation indicates a change of the display range, the gallery display control unit 751 changes the display range according to the operation input through the operation acceptance unit 73 and detects the display range after the change (see FIG. 5, step S270).

When the display range after the change is detected, the gallery display control unit 751 determines whether or not the display range after the change has reached the predetermined range from the outer periphery of the video gallery display screen (see FIG. 5, step S250). If the display range after the change has not reached the predetermined range from the outer periphery of the video gallery display screen (see "OUT OF PREDETERMINED RANGE" in step S250 in FIG. 5), the gallery display control unit 751 displays the video gallery display screen by a size corresponding to the changed display range and by an identification display manner according to the size of the changed display range (see FIG. 5, step S255).

In contrast, if the display range after the change has reached the predetermined range from the outer periphery of the video gallery display screen (see "WITHIN PREDETERMINED RANGE" in step S250 in FIG. 5), the gallery display control unit 751 transmits, according to the changed display range, the video gallery data distribution request, which includes information that indicates the display position of videos, to the video distribution device 5 (see FIG. 5, step S260).

Next, the gallery display control unit 751 receives the video gallery display screen transmitted from the video distribution device 5, determines the changed display range to be the current display range, and displays the video gallery display screen having a size of the changed display range by using an identification display manner according to the size of the changed display range (see FIG. 5, step S255).

Figure 12:
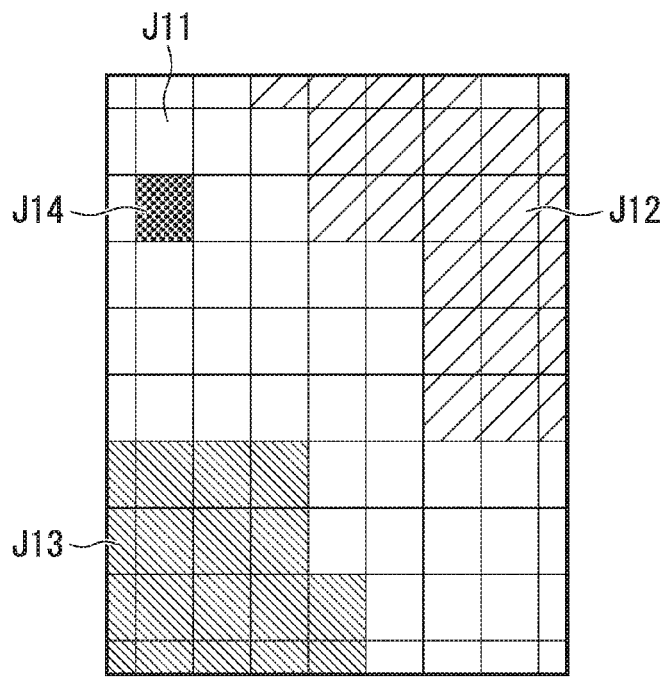
FIG. 12 is a diagram showing an example of the video gallery display screen displayed by the display unit of the terminal device.
Figure 13:
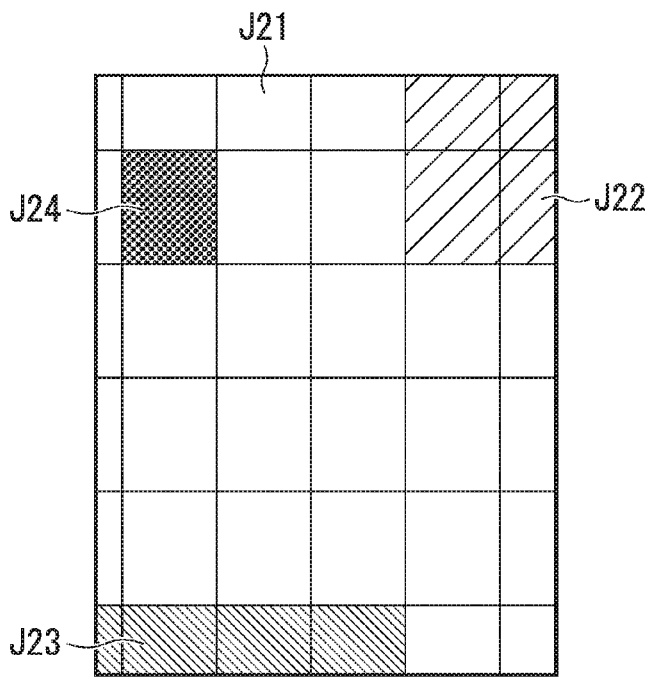
FIG. 13 is a diagram showing a display example when an operation is input so as to enlarge the display size in the display range of the video gallery display screen in FIG. 12.

FIG. 12 is a diagram showing a display example of the video gallery display screen displayed by the display unit 72 of the terminal device 7. FIG. 13 is a diagram showing a display example when an operation is input so as to enlarge the display size in the display range of the video gallery display screen in FIG. 12.

In FIG. 12, a first group (see reference numeral J11) in which video data items belonging to a category of sports are arranged; a second group (see reference numeral J12) in which video data items belonging to a category of cars are arranged; a third group (see reference numeral J13) in which video data items belonging to a category of trains are arranged; and a region (see reference numeral J14) in which video data having a high degree of attention is arranged are displayed by using the degree of the identification display according to the display size in the display range. In this display state, if an operation to enlarge the video gallery display screen is input through the operation acceptance unit 73, the enlarged video gallery display screen is displayed as shown in the example of FIG. 13, where the difference in the degree of the identification display among the groups is reduced.

For example, if the difference before the enlargement in the degree of brightness between the displayed first group (see FIG. 12, J11) and the displayed third group (see FIG. 12, J13) is K1 and the difference after the enlargement in the degree of brightness between the displayed first group (see FIG. 13, J21) and the displayed third group (see FIG. 13, J23) is K2, then K1>K2. According to such a change in the degree of the identification display, in comparison with the state before the enlargement, the difference after the enlargement in the degree of brightness among the first group (see FIG. 13, J21), the second group (see FIG. 13, J22), and the third group (see FIG. 13, J23) is smaller.

The display image of video data having a high degree of attention may be displayed by an identical identification display manner between before the enlargement (see FIG. 12, reference numeral J14) and after the enlargement (see FIG. 13, reference numeral J24), or the degree of the identification display may be changed according to the enlargement or reduction of the display size in the display range. For example, the greater the degree of enlargement in the display range, the higher the level of red in hue, and the greater the degree of reduction in the display range, the lower the level of red in hue.

Here, the gallery display control unit 751 follows an instruction to designate the range of the video gallery display screen, which is displayed in the display region as the display target (e.g., an enlargement or reduction instruction). If an instruction to reduce the size in the display range is input, the gallery display control unit 751 performs reduction display at the display unit 72 by increasing the number of the display images, which indicate video data items included in the display range of the video gallery display screen, where the degree of the identification display determined for each group is changed according to the number of the video data items included in the relevant display region. If an instruction to enlarge the size in the display range is input, the gallery display control unit 751 performs enlargement display at the display unit 72 by decreasing the number of the display images, which indicate video data items included in the display range of the video gallery display screen, where the degree of the identification display for each group is changed according to the number of the video data items included in the relevant display region.

In the above explanation, the display screen is enlarged from the display example of FIG. 12 to the display example of FIG. 13. However, if the size in the display range is reduced from the display example of FIG. 13 to the display example of FIG. 12, the difference in the degree of the identification display among the groups is increased.

On the other hand, in step S265 in FIG. 5, if the input operation does not indicate a change of the display range, the control unit 75 determines whether or not the input operation is a display instruction operation (see FIG. 5, step S275). If the input operation is a display instruction operation (i.e., "YES" in the step in FIG. 5), the terminal device 7 executes a video display operation flow shown in FIG. 14 explained later. The display instruction operation for video data, performed on the screen displayed by the display unit 72, is a user's tapping or double-tapping operation on the display range of the image of video data as the display target. If the input operation is not the display instruction operation (i.e., "NO" in the step S275 in FIG. 5), the control unit 75 determines whether or not the input operation is an instruction to terminate the video display (see FIG. 5, step S280). If the input operation is the termination instruction (i.e., "YES" in step S280 in FIG. 5), the control unit 75 terminates the video gallery display operation (i.e., the operation in FIG. 5). If the input operation is not the termination instruction (i.e., "NO" in step S280 in FIG. 5), the control unit 75 performs the process according to the relevant operation (see FIG. 5, step S285) and the operation returns to step S240 in FIG. 5.

The gallery display control unit 751 may limit the amount of movement for one display movement operation. Accordingly, it is possible to prevent the display range from quickly reaching the predetermined range from the outer periphery of the video gallery display screen, which causes frequent transmission of the video distribution request. It is also possible to prevent that before the next video gallery display screen is received, part of the display range becomes out of the range of the current video gallery display screen.

If the terminal device 7 received and displayed a video gallery display screen in the past, the gallery display control unit 751 may include information, which indicates the last display position on the video gallery display screen, in the video gallery data distribution request in step S205 of FIG. 5.

Figure 14:
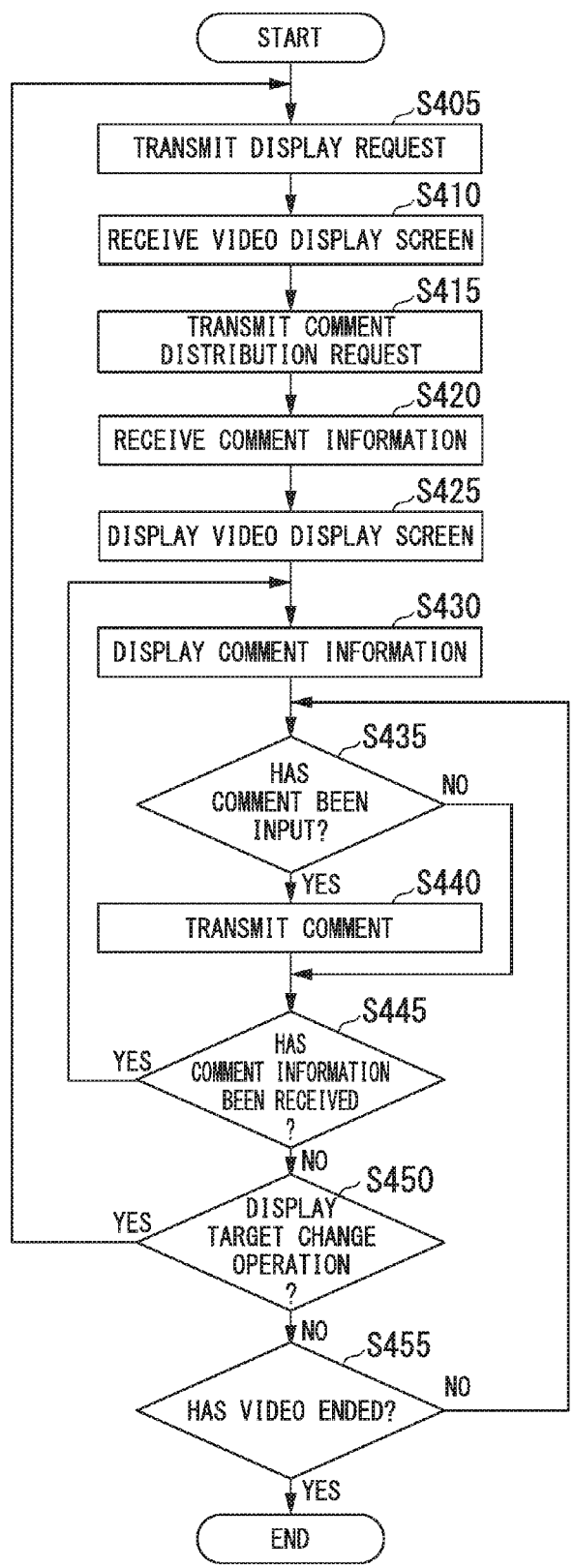
FIG. 14 is a flowchart showing a video display operation of the terminal device in the embodiment.
Figure 15:
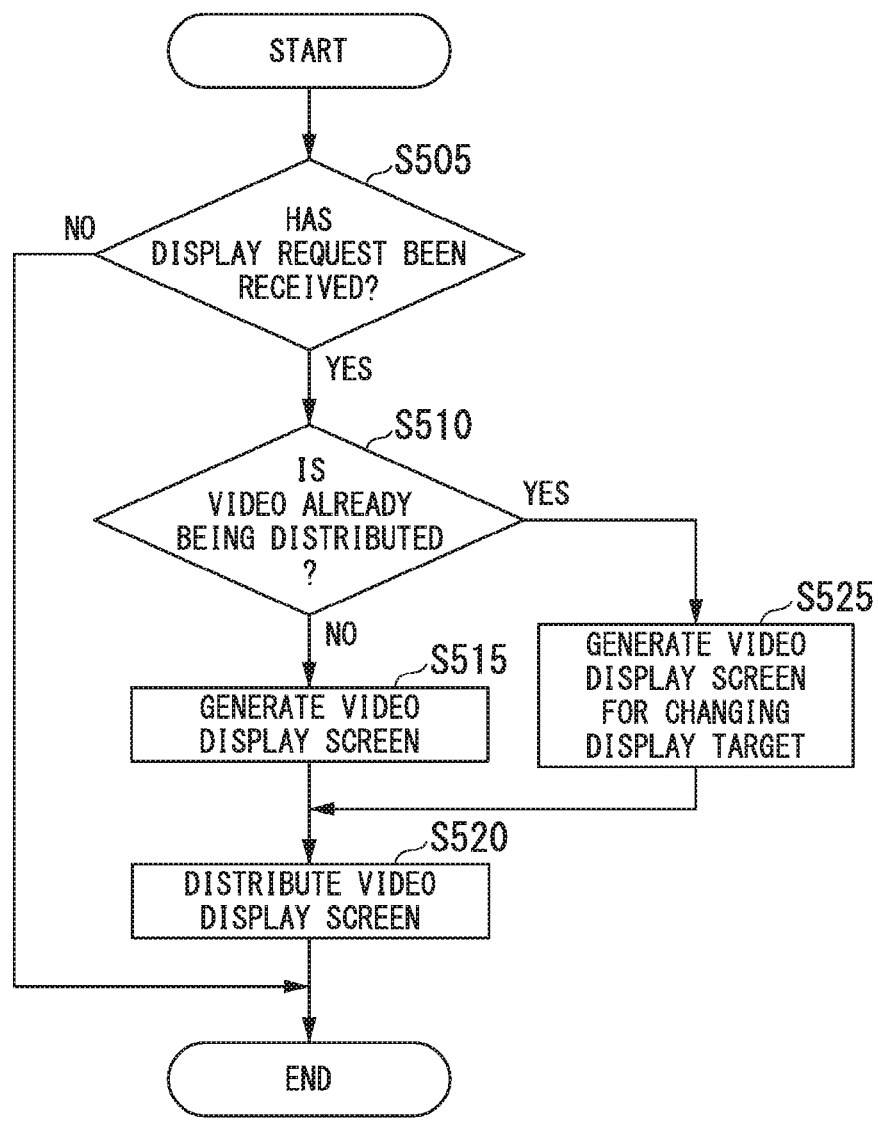
FIG. 15 is a flowchart showing a video display screen distributing operation of the video distribution device in the embodiment.
Figure 16:
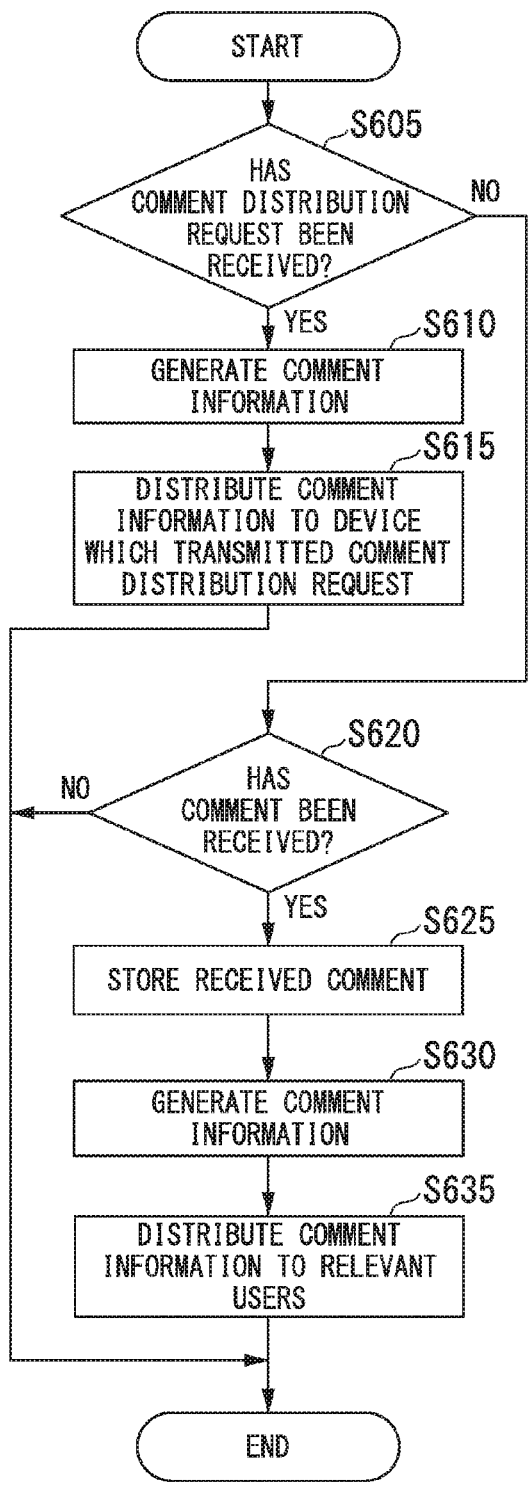
FIG. 16 is a flowchart showing a comment distribution operation of the video distribution device in the embodiment.

Next, the video distribution operation of the video distribution system 1 will be explained with reference to operation flows in FIGS. 14 to 16. FIG. 14 is a diagram showing a video display operation flow performed by the terminal device 7. FIG. 15 is a diagram showing a video display screen distributing operation flow performed by the video distribution device 5. FIG. 16 is a diagram showing a comment distribution operation flow performed by the video distribution device 5.

In FIG. 14, the video display control unit 753 of the terminal device 7 transmits a display request which includes display target video information utilized to identify video data selected as a display target by the display instruction operation (see FIG. 14, step S405). The video display control unit 753 may retrieve information, which indicates the video ID or the arrangement position of the selected video data, from the video gallery display screen and use the information as the display target video information so as to transmit the display request.

In FIG. 15, the video display screen generation unit 519 of the video distribution device 5 determines whether or not the display request has been received (see FIG. 15, step S505). If the video display screen generation unit 519 determines that the display request has not been received, the operation flow is terminated (i.e., "NO" in step S505 in FIG. 15). Here, it is determined that the display request has been received (i.e., "YES" in step S505 in FIG. 15). The video display screen generation unit 519 then determines whether or not a video display screen is already being distributed to the terminal device 7 which transmitted the display request (see FIG. 15, step S510). If it is determined that no video display screen has been distributed to the terminal device 7 which transmitted the display request (i.e., "NO" in step S510 in FIG. 15), the video display screen generation unit 519 performs the process in step S515.

The video display screen generation unit 519 obtains the video ID of the video data as the display target (called a "display target video ID" below) from the display target video information which is included in the received display request. If the display target video information indicates the arrangement position, the video display screen generation unit 519 retrieves the video ID corresponding to the arrangement position from the video gallery data and determines the retrieved ID to be the display target video ID.

The video display screen generation unit 519 identifies the arrangement position corresponding to the display target video ID in the video gallery data and retrieves video IDs of other video data items at arrangement positions adjacent to the identified arrangement position. In the present embodiment, the video display screen generation unit 519 retrieves a video ID (called a "right-adjacent video ID" below) at an arrangement position adjacent to and on the right side of the arrangement position corresponding to the display target video ID and a video ID (called a "left-adjacent video ID" below) at an arrangement position adjacent to and on the left side of the arrangement position corresponding to the display target video ID.

Among the video data received by the video reception unit 513, the video display screen generation unit 519 obtains video data as the display target identified by the display target video ID; video data identified by the right-adjacent video ID; and video data identified by the left-adjacent video ID. The video display screen generation unit 519 generates a video display screen in which (i) the image of the video data as the display target is displayed with a size greater than that of the display images on video gallery display screen and (ii) images of video data items at arrangement positions adjacent to the arrangement position of the display target are displayed adjacent to the image of the display target in a manner such that part of each adjacent image is cut by the outer periphery of the screen (see FIG. 15, step S515).

For example, the video display screen generation unit 519 arranges the image of the video data having the right-adjacent video ID on the right side of the image of the video data as the display target and arranges the image of the video data having the left-adjacent video ID on the left side of the image of the video data as the display target on the video display screen. The video IDs of the displayed video data items are added to the video display screen. The video display screen generation unit 519 distributes the generated video display screen to the terminal device 7 which transmitted the display request (see FIG. 15, step S520).

In FIG. 14, the video display control unit 753 of the terminal device 7 receives the video display screen from the video distribution device 5 (see FIG. 14, step S410). The comment processing unit 754 transmits a comment distribution request, which includes the video ID of the video data as the display target, to the video distribution device 5 (see FIG. 14, step S415).

In FIG. 16, the comment distribution processing unit 53 of the video distribution device 5 determines whether or not the comment distribution request has been received (see FIG. 16, step S605). Here, the comment distribution processing unit 53 determines that the comment distribution request has been received (i.e., "YES" in step S605 in FIG. 16). The comment distribution unit 533 obtains the video ID included in the comment distribution request. The comment distribution unit 533 retrieves comment data associated with the obtained video ID from the comment storage unit 532, where a predetermined number of comment data items are retrieved starting from an item having the latest posting time. The comment data includes the video ID of the video data as the target for the comment, comment posting time, a user ID of a user who posted the comment, and text data of the content of the comment.

For each retrieved comment data item, the comment distribution unit 533 retrieves a user name and an icon image data, which are stored, in advance, in the storage unit 511 or the comment storage unit 532 in association with the user ID included in the comment data. The comment distribution unit 533 generates comment information which includes the content of the comment (comment content) and the posting time in the comment data, and the user name and the icon image data retrieved according to the user ID in the comment data (see FIG. 16, step S610). The comment distribution unit 533 transmits the generated comment information to the terminal device 7 which transmitted the comment distribution request (see FIG. 16, step S615).

In FIG. 14, the comment processing unit 754 of the terminal device 7 receives the comment information from the video distribution device 5 (see FIG. 14, step S420). The video display control unit 753 makes the display unit 72 display the video display screen received in step S410 (see FIG. 14, step S425). The comment processing unit 754 also makes the display unit 72 display the comment information received in step S420, in addition to the video display screen being displayed by the display unit 72, where the comment information items are displayed in order of the posting time (see FIG. 14, step S430).

Figure 17:
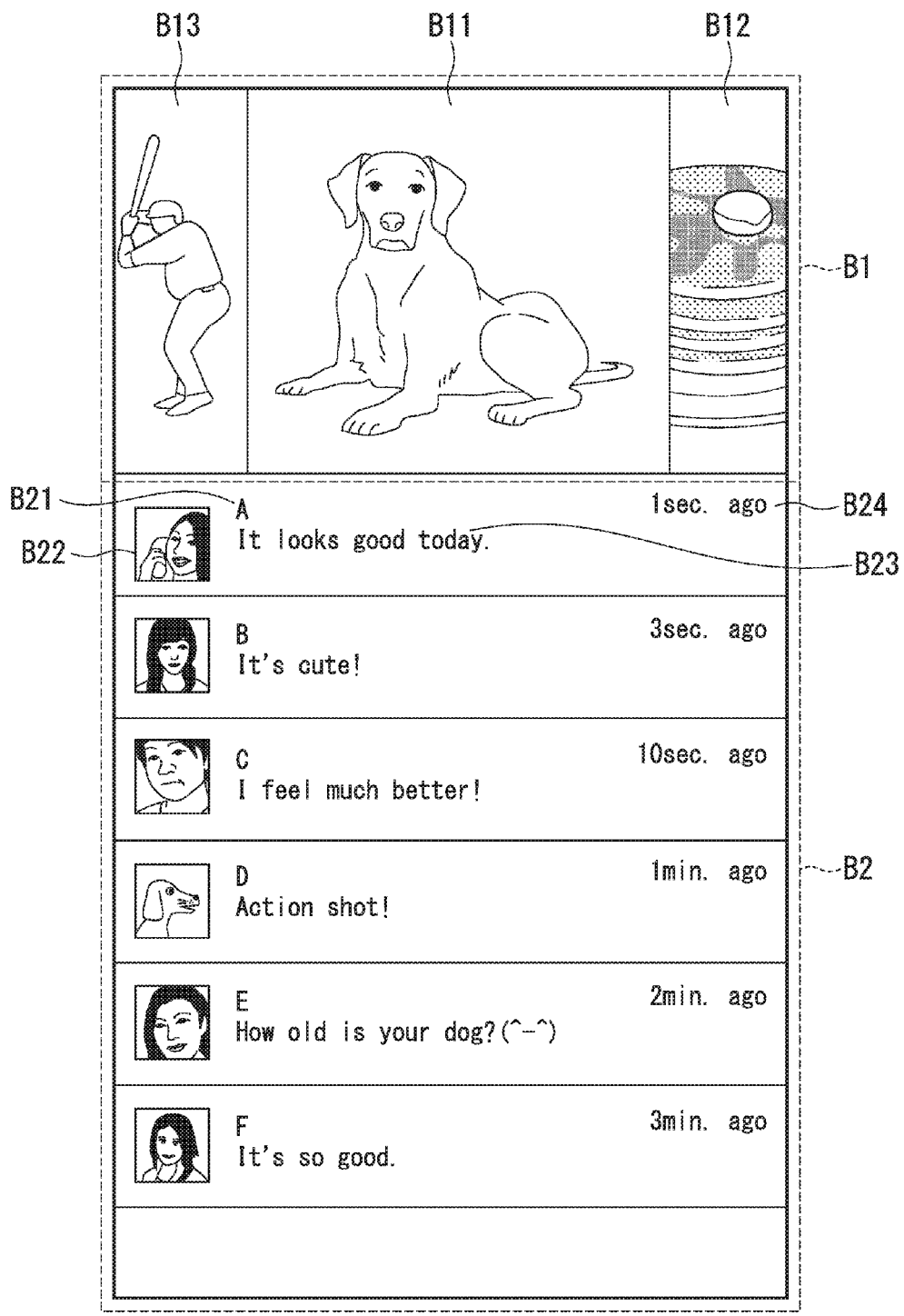
FIG. 17 is a diagram showing an example of the video display screen displayed by the display unit of the terminal device in the embodiment.
Figure 18:
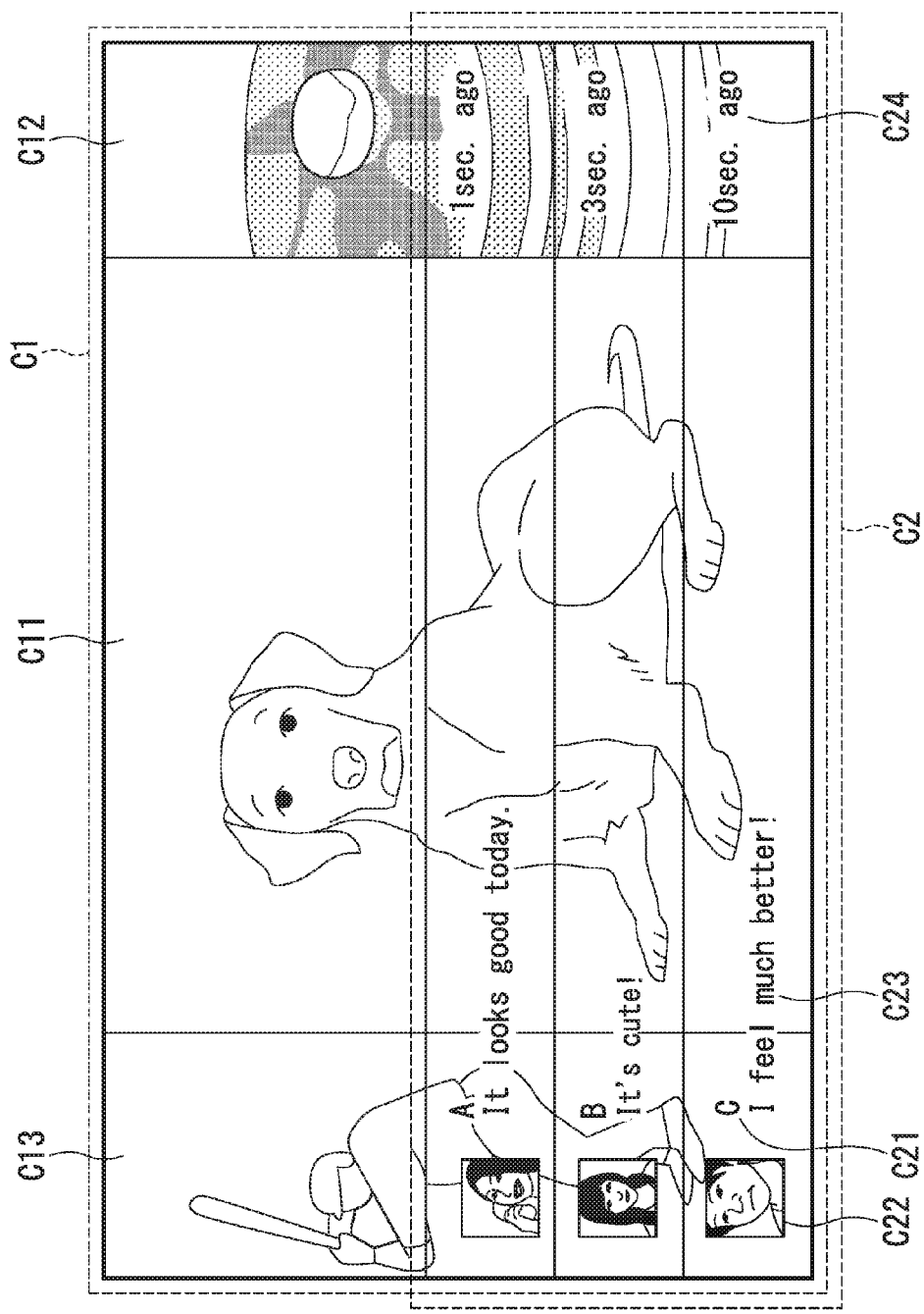
FIG. 18 is a diagram showing another example of the video display screen displayed by the display unit of the terminal device in the embodiment.

FIGS. 17 and 18 are diagrams showing examples of the video display screen displayed by the display unit 72 of the terminal device 7.

FIG. 17 is an example when the display unit 72 is used in a vertically long state. As shown in FIG. 17, the screen displayed by the display unit 72 has a video display region B1 and a comment display region B2 which is arranged under the video display region B1. The video display region B1 consists of display regions B11 B12, and B13. In the display region B11, the display image of the video data as the display target is displayed. In the adjacent display region B12 on the right side of the display region B11, the image of the video data having the right-adjacent video ID is displayed. In the adjacent display region B13 on the left side of the display region B11, the image of the video data having the left-adjacent video ID is displayed. For the video data of the right-adjacent video ID and the video data of the left-adjacent video ID, their images are displayed in a manner such that part of each image is cut by the outer periphery of the display unit 72.

In the comment display region B2, the comment information items are displayed and arranged from the upper side to the lower side of the screen in order of the posting time starting from the item having the latest posting time. Each comment information item includes a user name B21, icon image data B22 of the user who posted the comment, a comment content B23, and a posting time B24. The comment processing unit 754 displays the posting time B24 while frequently updating it according to the difference between the current time and the posting time. The posting time may be the time when each comment was posted.

FIG. 18 is an example when the display unit 72 is used in a horizontally long state. As shown in FIG. 18, the screen displayed by the display unit 72 has a video display region C1 and a comment display region C2 which is superimposed on a lower part of the video display region C1. The video display region C1 consists of display regions C11, C12, and C13. In the display region C11, the display image of the video data as the display target is displayed. In the adjacent display region C12 on the right side of the display region C11, the image of the video data having the right-adjacent video ID is displayed. In the adjacent display region C13 on the left side of the display region C11, the image of the video data having the left-adjacent video ID is displayed. For the video data of the right-adjacent video ID and the video data of the left-adjacent video ID, their images are displayed in a manner such that part of each image is cut by the outer periphery of the display unit 72. In the comment display region C2, the comment information items are displayed in order of the posting time starting from the item having the latest posting time. Each displayed comment information item includes a user name C21, icon image data C22, a comment content C23, and a posting time C24.

When the video display screen as shown in FIG. 17 or 18 is displayed by the terminal device 7, the user can also watch a partial region of the other video data items while watching the video data as the display target. Therefore, when the user watches the video designated as the display target, it is possible for the user to tend to take an interest in other video data without annoying the user. In addition, since part of each video data item on both sides of the designated and displayed video data is cut by the outer periphery of the screen and thus only a partial region of the video data item is displayed, the user can recognize that the display target can be shifted to the video data item, that is, an input operation to shift the video data, which is displayed adjacent to and on the right or left side of the center video, to the center is possible if the user takes an interest in the video data on said both sides.

Returning to FIG. 14, if the operation acceptance unit 73 receives a comment input operation by the user while the display unit 72 displays the video display screen, the comment processing unit 754 of the terminal device 7 determines that the comment input operation has been accepted (i.e., "YES" in step S435 in FIG. 14), and the comment processing unit 754 transmits comment data to the video distribution device 5 (see FIG. 14, step S440). The comment data includes the video ID of the video data as the display target, the user ID, the content of the comment accepted by the operation acceptance unit 73, and the comment posting time.

In FIG. 16, when the comment distribution processing unit 53 of the video distribution device 5 determines that the comment distribution request has not been received (i.e., "NO" in step S605 in FIG. 16), the comment distribution processing unit 53 determines whether or not comment data has been received (see FIG. 16, step S620). If the comment distribution processing unit 53 determines that comment data has not been received (i.e., "NO" in step S620 in FIG. 16), the operation flow is terminated. Here, the comment distribution processing unit 53 determines that comment data has been received (i.e., "YES" in step S620 in FIG. 16). The comment reception unit 531 additionally stores the received comment data in the comment storage unit 532 (see FIG. 16, step S625).

The comment distribution unit 533 retrieves a user name and an icon image data, which are stored, in advance, in the storage unit 511 or the comment storage unit 532 in association with the user ID included in the additionally stored comment data. The comment distribution unit 533 generates comment information which includes the content of the comment (comment content) and the posting time in the comment data, and the user name and the icon image data retrieved according to the user ID in the comment data (see FIG. 16, step S630). The comment distribution unit 533 distributes the generated comment information to the terminal device 7 of each user who is watching the video data of the video ID included in the additionally stored comment data (see FIG. 16, step S635). That is, the terminal device 7 to which the comment information is distributed is each terminal device 7 to which the video display screen generation unit 519 is distributing the video display screen in which the video data, which has the video ID included in the additionally stored comment data, is the display target. This terminal device 7 is not only the terminal device 7 which transmitted the comment data, but also other terminal devices 7 whose display target of the video data is the same as that of the terminal device 7 which transmitted the comment data.

In FIG. 14, after the process of step S440, the comment processing unit 754 of the terminal device 7, which transmitted the comment data, receives the comment information from the video distribution device 5 (i.e., "YES" in step S445 in FIG. 14) and performs the operation from step S430. In contrast, the comment processing unit 754 of said other terminal devices 7 determines that no comment input has been performed in step S435 (i.e., "NO" in step S435 in FIG. 14), then receives the comment information (i.e., "YES" in step S445 in FIG. 14) and performs the operation from step S430.

The comment processing unit 754 makes the display unit 72 additionally display the received comment information as the latest comment information on the video display screen displayed by the display unit 72 (see FIG. 14, step S430). If the comment processing unit 754 has already displayed a maximum (possible) number of comment information items at the display unit 72, the comment processing unit 754 deletes the comment information having the oldest posting time and makes the display unit 72 additionally display the received comment information. Accordingly, the comment content which was input for the video data as the display target by the own terminal device or another terminal device 7 is displayed by the comment processing unit 754 on the video display screen.

If the comment processing unit 754 of the terminal device 7 determines that no comment input has been performed (i.e., "NO" in step S430 in FIG. 14) and that no comment information has been received (i.e., "NO" in step S445 in FIG. 14), the video display control unit 753 determines whether or not a display target change operation has been received (see FIG. 14, step S450). The display target change operation is a swiping or flicking operation on the screen displayed by the display unit 72. For example, in order to determine the video data displayed in the display region B12 of FIG. 17 or the display region C12 of FIG. 18 to be a new display target, the display target change operation is the swiping or flicking operation from right to left.

Similarly, in order to determine the video data displayed in the display region B13 of FIG. 17 or the display region C13 of FIG. 18 to be a new display target, the display target change operation is the swiping or flicking operation from left to right. When the video display control unit 753 determines that the display target change operation has been received (i.e., "YES" in step S450 in FIG. 14), the operation from step S405 is repeated. In step S405, the video display control unit 753 determines the video data as the new display target in accordance with the display target change operation and transmits the display request which includes the video ID (as the display target video information) of the video data determined to be the new display target. The display target video information may be information which indicates the video ID of the video data as the current display target and the direction of the display target change operation.

In FIG. 15, the video display screen generation unit 519 of the video distribution device 5 determines that the display request has been received (i.e., "YES" in step S505 in FIG. 15). The video display screen generation unit 519 also determines that a video display screen is already being distributed to the terminal device 7 which transmitted the display request (i.e., "YES" in step S510 in FIG. 15). The video display screen generation unit 519 retrieves the video ID from the display target video information included in the display request and determines the retrieved ID to be the display target video ID. If the display target video information indicates the video ID of the video data as the current display target and the direction of the display target change operation, the video display screen generation unit 519 identifies the arrangement position corresponding to the video ID in the video gallery data. The video display screen generation unit 519 then obtains the video ID, as the display target video ID, whose arrangement position is adjacent to the identified arrangement position in the direction corresponding to the direction of the display target change operation (e.g., in the right direction if the direction of the operation is right to left).

The video display screen generation unit 519 identifies the arrangement position corresponding to the display target video ID in the video gallery data and retrieves the right-adjacent video ID and the left-adjacent video ID. From the video display screen currently distributed to the terminal device 7, the video display screen generation unit 519 generates a video display screen by moving the image of the video data as the new display target to the display region where the image of the video data as the current display target is displayed (see FIG. 15, step S525). In the generated video display screen, the image of the video data having the right-adjacent video ID is displayed adjacent to and on the right side of the image of the video data as the new display target, and the image of the video data having the left-adjacent video ID is displayed adjacent to and on the left side of the image of the video data as the new display target. The video display screen generation unit 519 distributes the generated video display screen to the terminal device 7 which transmitted the display request (see FIG. 15, step S520).

After the video display control unit 753 of the terminal device 7 receives the video display screen from the video distribution device 5 in step S410 in FIG. 14, an operation similar to that described above is performed.

In step S450, if the video display control unit 753 determines that no display target change operation has been received (i.e., "NO" in step S450 in FIG. 14), the video display control unit 753 determines whether or not the video data as the display target has ended (see FIG. 14, step S455). If the video display control unit 753 determines that the video data has not ended, the operation from step S435 in FIG. 14 is repeated (i.e., "NO" in step S455 in FIG. 14). If it is determined that the video data has ended, the operation flow is terminated (i.e., "YES" in step S455 in FIG. 14).

In the video display screen of the above explanation, only a partial region of each image of other video data items is displayed adjacent to and on the right and left sides of the image of the video data as the display target. However, only a partial region of each image of the other video data items may be displayed adjacent to and on the upper and lower sides of the image of the video data as the display target.

In this case, in steps S515 and S525 in FIG. 15, the video display screen generation unit 519 retrieves a video ID (called an "upper-adjacent video ID" below) at an arrangement position adjacent to and on the upper side of the arrangement position corresponding to the display target video ID and a video ID (called a "lower-adjacent video ID" below) at an arrangement position adjacent to and on the lower side of the arrangement position corresponding to the display target video ID. The video display screen generation unit 519 generates a video display screen in which the image of the video data having the upper-adjacent video ID is displayed adjacent to and on the upper side of the image of the video data as the display target and the image of the video data having the lower-adjacent video ID is displayed adjacent to and on the lower side of the image of the video data as the display target.

In addition, although only part of each image of said other video data items is displayed adjacent to and on the right and left sides of the image of the video data as the display target, the entire images of said other video data items may be displayed.

In the above video display screen, as the information which indicates that another video data item can be selected and displayed as the new display target, only part of each image of other video data items is displayed adjacent to and on the right and left sides or the upper and lower sides of the image of the video data as the display target in a manner such that part of said each image is cut by the outer periphery of the screen. However, other information may be employed.

Figure 19:
FIG. 19 is a diagram showing another example of the video display screen displayed by the display unit of the terminal device in the embodiment.

FIG. 19 is a diagram showing another example of the video display screen displayed by the display unit 72 of the terminal device 7, where the display unit 72 is used in a vertically long state. In FIG. 19, as the information which indicates that another video data item can be selected and displayed as the new display target on the video display screen, arrows B31 and B32 are utilized. On the video display screen, the arrow B31, which indicates that video data adjacent to and on the right side of the video data as the display target in the gallery display can be selected as the new display target, is displayed in a region corresponding to the display region B12 in FIG. 17 or the display region C12 in FIG. 18. Additionally, on the video display screen, the arrow B32 (see FIG. 19), which indicates that video data adjacent to and on the left side of the video data as the display target in the gallery display can be selected as the new display target, is displayed in a region corresponding to the display region B13 in FIG. 17 or the display region C13 in FIG. 18.

In addition, in the above embodiment, although the information which indicates that another video data item can be selected and displayed as the new display target is displayed adjacent to the image of the video data as the display target, the information may be displayed at another position.

Additionally, on the video display screen, the video display screen generation unit 519 of the video distribution device 5 may change other video data items, whose images are displayed adjacent to the image of the video data as the display target, at regular time intervals, where any video data may be selected as said other video data after the change.

On the above-described video gallery display screen, the square display images (of the video data items) having the same size are arranged in a tiling manner in the horizontal and vertical directions. However, the display images may have different sizes, and thus for each video data item, a display image having a different size may be arranged. Additionally, display images having a shape other than the square may be arranged. For example, the longitudinal length of each display image may be a multiple of the length of the side of a square and the lateral length thereof may have any value.

In addition, if the video gallery display screen generation unit 516 of the video distribution device 5 has not received video data for live distribution, whose display image is to be displayed in the transmission range, the video gallery display screen generation unit 516 retrieves content data stored in association with the relevant video data in advance in the storage unit 511. The video gallery display screen generation unit 516 generates a video gallery display screen on which a display screen of the retrieved content data is displayed instead of the video data for the live distribution. For example, the content data is static image data or video data utilized to communicate the start time or the end of the live distribution.

The above embodiment employed an example which uses the video data of live video. However, the video distribution device 5 may perform the above operation by using uploaded video data stored in the storage unit 511 in advance. In this case, the comment data transmitted from the comment processing unit 754 of the terminal device 7 further includes a commenting time which indicates a video reproduction time when the comment (content) was posted, measured from the reproduction starting time of the relevant video data. The comment information distributed from the comment distribution unit 533 of the video distribution device 5 also includes the commenting time. The comment processing unit 754 of the terminal device 7 retrieves the comment information which includes the video reproduction time that coincides with the video reproduction time of the video data displayed on the video display screen. The comment processing unit 754 adds the retrieved comment information to the video display screen so that the comment information is displayed.

As an example, if the operation acceptance unit 73 of the terminal device 7 receives an operation to instruct that no comment is displayed, then even when comment information is distributed from the video distribution device 5, the comment processing unit 754 does not display it.

In the above embodiment, when the display unit 72 of the terminal device 7 displays the video gallery display screen, the outermost display images are displayed by the display unit 72 in a manner such that part of each image is cut by the outer periphery of the display range of the display unit 72, as the information which indicates that there are display images outside the display range and the display range is movable. However, another manner may be employed. For example, the video gallery display screen generation unit 516 of the video distribution device 5 generates a video gallery display screen in which information which indicates that the display range is movable is also displayed in addition to the display range on the video gallery display screen.

Figure 20:
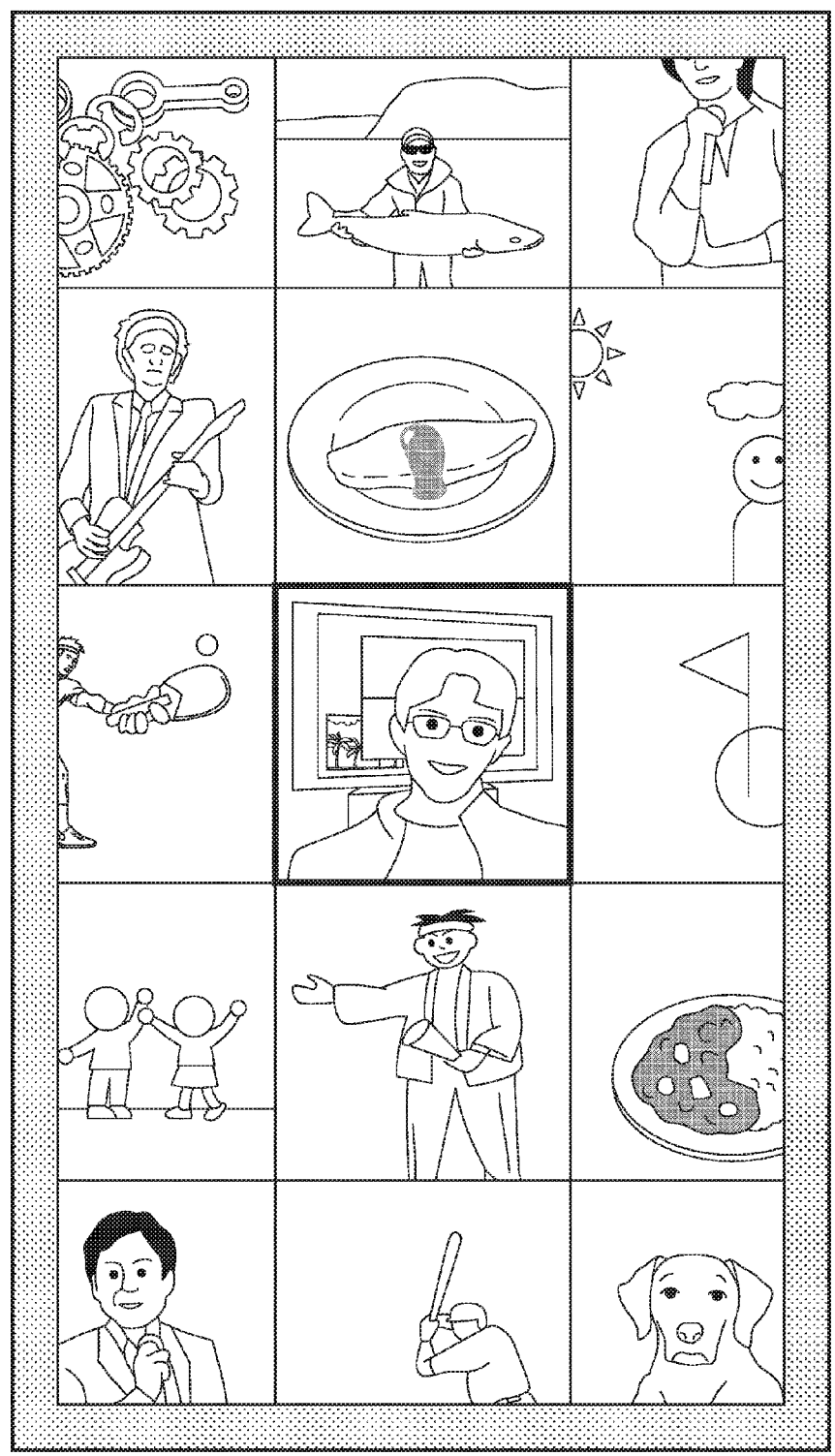
FIG. 20 is a diagram showing another example of the video gallery display screen displayed by the display unit of the terminal device in the embodiment.

FIG. 20 is a diagram which shows another display example of the video gallery display screen displayed by the display unit 72 of the terminal device 7. The gallery display control unit 751 changes the color of the outer periphery of the display range determined in step S215 in FIG. 5, which is displayed by the display unit 72.

Figure 21:
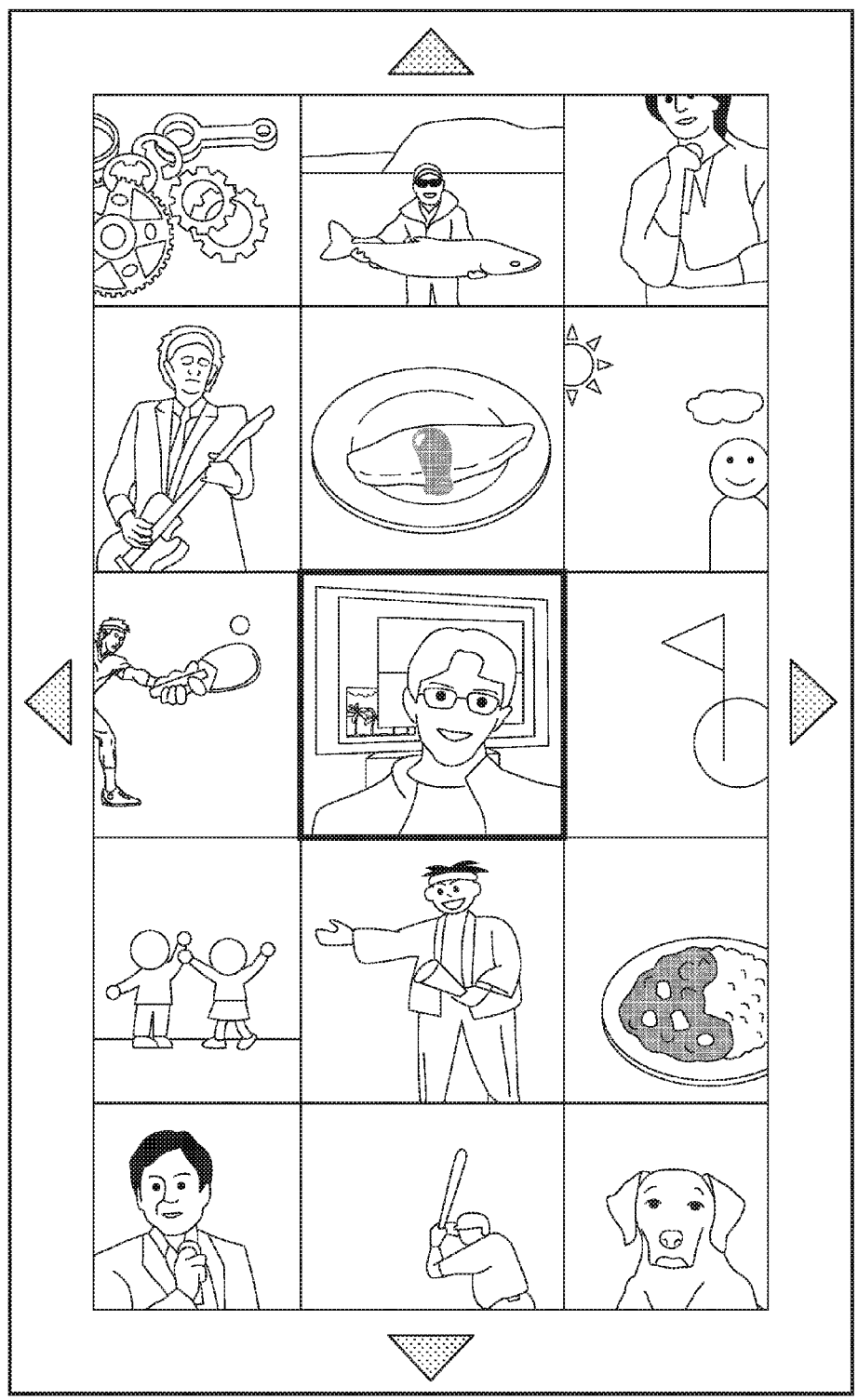
FIG. 21 is a diagram showing another example of the video gallery display screen displayed by the display unit of the terminal device in the embodiment.

FIG. 21 is also a diagram which shows another display example of the video gallery display screen displayed by the display unit 72 of the terminal device 7. As shown in FIG. 21, the gallery display control unit 751 displays arrows on the upper, lower, right, and left sides of the display range determined in step S215 in FIG. 5, where such arrows may be displayed within the display range.

In the above-explained embodiment, the gallery display control unit 751 of the terminal device 7 changes the degree of the identification display according to an enlargement or reduction instruction for the display range. In another example, an instruction to change the display size in the display range may be transmitted from the terminal device 7 to the video distribution device 5, and the processing unit 520 of the video distribution device 5 may generate a video gallery display screen in which the degree of the identification display is changed according to the enlargement or reduction instruction for the display range. The generated video gallery display screen is transmitted to the terminal device 7.

According to the above-explained embodiment, the user selects the video to be watched while moving the display range of the video gallery formed in a tiling manner. When the user watches the selected video, other videos may be partially displayed on both sides of the selected video in a selectable manner, that is, information which indicates that another video data item can be selected and displayed as a new display target. Therefore, it is possible to make the user be conscious that there are videos other than those included in the video gallery currently displayed by the terminal device or the video as the display target, by which paths to other videos can be secured. Therefore, it is possible to give the user an opportunity of selecting a greater number of videos. Furthermore, the user can easily find and watch a desired video while enjoying the finding operation.

The above-explained embodiment may be implemented as structures as shown below.

Structural Example 1

A video distribution device comprising:

an arrangement determination unit that determines arrangement of display images of video data items in video gallery data according to information about the video data items;

a transmission range determination unit that receives information about a display position of a video gallery display screen from a terminal device and determines, according to the received information, a transmission range for the video gallery data, to be a size greater than a possible display range of the terminal device;

a video gallery display screen generation unit that generates the video gallery display screen in which the display images of the video data items included in the transmission range determined by the transmission range determination unit are arranged according to the arrangement determined by the arrangement determination unit, wherein the video gallery display screen generation unit distributes the generated video gallery display screen to the terminal device; and a video display screen generation unit that receives a display request of a video data item from the terminal device and generates a video display screen in which the size of the image of the video data item as a display target indicated by the received display request is greater than the size of each display image on the video gallery display screen, wherein the video display screen generation unit distributes the generated video display screen to the terminal device.

Structural Example 2

The video distribution device in accordance with Structural example 1, wherein the information about the video data items is one or more of popularity of each video data item; popularity of the provider of the video data item; the number of users who watch the video data item and belong to a specific attribute; the number of appearance of a predetermined expression included in comments received from the terminal devices of users who watch the video data item; the attribute of the video data item; the genre of the video data item; points or the amount of money paid by the provider of the video data item; and results of competition for an arrangement position for the reduced screens.

In Structural example 2, the information about the video data items may be a watching status specified according to a video distribution request transmitted from each terminal device 7 to the video distribution device 5, or information stored in a user data storage unit that stores the name, hobby, and video data watching history of the user who uses each terminal device 7. In addition, comments transmitted from the terminal devices 7 of the users who watch each video data item are received from the terminal devices 7, and according to the received comments, a result of counting the number of appearance of a predetermined expression (character string) may be used as the relevant information. As the attribute or genre of the video data, a category assigned to each video data item may be utilized. In addition, a numerical value of points consumed by the provider of the video data item or the amount of money paid by the provider so as to receive a service from the video distribution device 5 may be utilized. In addition, an auction may be performed for a position on the video gallery display screen (i.e., reduced image arrangement position), and information about a user who paid the greatest amount of money may be utilized.

As described above, since various types of information can be used as the information about the video data items, the position arranged in the video gallery display screen can be determined according to various factors. If the arrangement is performed according to the watching status, video data items, each having a high degree of popularity, can be arranged adjacent to each other. When video data items for which a specific expression was issued as comments are arranged side by side, video data items whose contents have some commonality can be arranged adjacent to each other. When the arrangement is determined according to the points or amount of money paid, if the own video data is arranged adjacent to video data having a high degree of popularity, the possibility that the own video data can be watched by lots of users is high. Therefore, for the surroundings of such popular video data, the points or amount of money may be determined according to a relative positional relationship between the popular video data and each arrangement position.

Structural Example 3

The video distribution device in accordance with Structural example 1 or 2, wherein when the video gallery display screen generation unit generates the video gallery display screen, the video gallery display screen generation unit applies a predetermined processing to the display image of a video data item which satisfies a predetermined condition that the video data item or a provider thereof has a high degree of popularity according to the information about the video data items.

For Structural example 3, the above-described identification display manner of the video data by using the degree of attention may be utilized.

Structural Example 4

The video distribution device in accordance with any one of Structural examples 1 to 3, wherein the arrangement determination unit determines the arrangement in the video gallery data in a manner such that around the display image of a video data item whose popularity or whose provider's popularity, which is indicated by the information about the video data items, satisfies a predetermined condition that indicates a high degree of popularity, the display image of another video data item is arranged which satisfies a predetermined condition about any one of paid points, the amount of paid money, results of competition, which are indicated by the information about the video data items.

Structural Example 5

The video distribution device in accordance with any one of Structural examples 1 to 4, wherein the arrangement determination unit determines the arrangement in the video gallery data in a manner such that around the display image of a video data item for which the number of appearance of a predetermined expression in comments received from user's terminal devices is a predetermined value or greater, the display image of another video data item, for which the information about the video data item satisfies a predetermined condition, is arranged or not arranged.

Structural Example 6

The video distribution device in accordance with any one of Structural examples 1 to 5, wherein the arrangement determination unit determines the arrangement of the display images of the video data items according to an attribute or a genre of each video data item; and
the transmission range determination unit determines the transmission range according to an attribute or a genre of the user of the terminal device.

Structural Example 7

The video distribution device in accordance with any one of Structural examples 1 to 6, wherein the arrangement determination unit generates the video gallery data for each attribute or genre for the video data items; and
the transmission range determination unit determines the transmission range in the video gallery data corresponding to the attribute of each video data item received from the terminal device.

Structural Example 8

The video distribution device in accordance with any one of Structural examples 1 to 7, wherein the arrangement determination unit determines the arrangement of the display images of the video data items in the video gallery data, for each terminal device to which the video gallery display screen is transmitted.

Structural Example 9

The video distribution device in accordance with any one of Structural examples 1 to 8, wherein the arrangement determination unit determines the arrangement of the display images of the video data items in the video gallery data according to the information about the video data items and information about the user of the terminal device.

Structural Example 10

The video distribution device in accordance with any one of Structural examples 1 to 9, wherein the transmission range determination unit determines the size of the transmission range according to any one or both of the display capability of the terminal device and the capacity of communication with the terminal device.

Structural Example 11

The video distribution device in accordance with any one of Structural examples 1 to 10, wherein:

the video data items includes live-distributed video data; and
the arrangement determination unit arranges at a position where the display image of a video data item whose live distribution was terminated was arranged, the display image of another video data item selected according to the information about the video data items.

The video distribution device 5 and the terminal device 7 each include a computer system. The steps in each operation of the video distribution device 5 and the terminal device 7 are stored as a program in a computer-readable storage medium, and the operation is performed when the relevant computer loads and executes the program. The above computer system includes hardware resources such as a CPU, various types of memories, an OS, and peripheral devices. The computer system includes a WWW system provided with a homepage service (or viewable) environment. The above computer readable storage medium is a storage device, for example, a portable medium such as a flexible disk, a magneto optical disk, a ROM, or a CD-ROM, or a memory device such as a hard disk built in a computer system. The computer readable storage medium also includes a device for temporarily storing the program, such as a volatile memory (RAM) in a computer system which functions as a server or client and receives the program via a network (e.g., the Internet) or a communication line (e.g., a telephone line).

The above program, stored in a memory device or the like of a computer system, may be transmitted via a transmission medium or by using transmitted waves passing through a transmission medium to another computer system. The transmission medium for transmitting the program has a function of transmitting data, and is, for example, a (communication) network such as the Internet or a communication line such (e.g., a telephone line). In addition, the program may execute a part of the above-explained functions. The program may also be provided as a "differential" file ("differential" program) so that the above-described functions can be executed by a combination program of the differential program and an existing program which has already been stored in the relevant computer system.

While an embodiment of the present invention has been explained in detail with reference to the drawings, specific structures are not limited to the embodiment. Design modifications or the like can be made without departing from the scope of the present invention.

In the above-described embodiment, the comment distribution processing unit 53 is provided in the video distribution device 5. However, the comment distribution processing unit 53 may be implemented as a separate device from the video distribution device 5. For example, a comment distribution device which has the function of the comment distribution processing unit 53 and a video distribution device may be connected to the network 9 so that the comment distribution device transmits comments according to video data to the terminal device 7.

REFERENCE SYMBOLS 1 video distribution system
3 video posting device
5 video distribution device
7 terminal device
9 network
51 video distribution processing unit
53 comment distribution processing unit
71 communication unit 72 display unit
73 operation acceptance unit
74 sound output unit
75 control unit
511 storage unit
512 arrangement determination unit
513 video reception unit
514 gallery display video generation unit
515 transmission range determination unit
516 video gallery display screen generation unit
517 display position receiving unit
518 sound distribution unit
519 video display screen generation unit
520 processing unit
531 comment reception unit
532 comment storage unit
533 comment distribution unit
751 gallery display control unit
752 sound control unit
753 video display control unit
754 comment processing unit

The invention claimed is:

1. A terminal device comprising:
a reception unit that receives from a video distribution device, a video gallery display screen in which display images of video data items transmitted from transmission source devices are arranged by group;
a display unit that has a display region to display a part of the video gallery display screen; and
a control unit that controls the display of the display unit wherein:
according to an instruction to designate a display target region in the video gallery display screen, the control unit changes the number of the display images of the video data items displayed in the display range in the video gallery display screen; and
according to the number of the display images displayed in the display range, the control unit changes difference among groups in a degree of identification display which is determined for each group so as to identify the group, wherein:
the control unit is configured to control the display in a manner such that the difference among the groups in the degree of the identification display increases as the number of the display images included in the display region increases according to an input operation.

2. The terminal device in accordance with claim 1, wherein:
any one or two or more of brightness, hue, and gradation for the display images are used as the identification display.

3. The terminal device in accordance with claim 1, wherein:
to a video having a high degree of attention determined according to an access status from terminal devices to the video distribution device, the control unit applies a different type of the identification display other than those applied to the groups.

4. The terminal device in accordance with claim 1, wherein:
the control unit accepts an input operation to select a group as a display target among the groups and makes the display images of videos belonging to the selected group be displayed as targets in the display region.

5. A video distribution device comprising:
a video gallery display screen generation unit that generates a video gallery display screen by arranging display images of video data items by group, which are received from transmission source devices;
a processing unit that processes the video gallery display screen by changing the number of the display images of the video data items as display targets to be displayed in a display region of the video gallery display screen in response to a request from a terminal device, where according to the number of the display images of videos displayed in the display range, the control unit changes difference among the groups in a degree of identification display which is determined for each group so as to identify the group; and
a distribution unit that distributes the processed video gallery display screen to the terminal device, wherein:
the processing unit controls the display in a manner such that the difference among the groups in the degree of the identification display increases as the number of the display images included in the display region increases according to an input operation.

6. A non-transitory computer readable recording medium storing a program that makes a computer function as the terminal device in accordance with claim 1.

* * * * *